United States Patent [19]

Omura et al.

[11] Patent Number: 5,253,526

[45] Date of Patent: Oct. 19, 1993

[54] CAPACITIVE ACCELERATION SENSOR WITH FREE DIAPHRAGM

[75] Inventors: Atsushi Omura; Masaaki Takagi; Shigekazu Nakamura, all of Tokyo, Japan

[73] Assignee: Copal Company Limited, Tokyo, Japan

[21] Appl. No.: 704,221

[22] Filed: May 22, 1991

[30] Foreign Application Priority Data

| May 30, 1990 | [JP] | Japan | 2-140742 |
| May 30, 1990 | [JP] | Japan | 2-140743 |
| May 30, 1990 | [JP] | Japan | 2-140744 |
| May 30, 1990 | [JP] | Japan | 2-140745 |
| Nov. 5, 1990 | [JP] | Japan | 2-299538 |

[51] Int. Cl.$^5$ .................................... G01P 15/125
[52] U.S. Cl. .................................. 73/517 R; 361/280
[58] Field of Search ............... 73/517 R, 517 B, 514; 361/280

[56] References Cited

U.S. PATENT DOCUMENTS

| 3,498,138 | 3/1970 | Stewart | 73/517 B |
| 4,393,710 | 7/1983 | Bernard . | |
| 4,399,705 | 8/1983 | Weiger et al. . | |
| 4,435,737 | 3/1984 | Colton | 73/517 R |
| 4,694,687 | 9/1987 | Bonin et al. | 73/116 |
| 5,085,079 | 2/1992 | Holdren et al. | 73/517 B |
| 5,092,174 | 3/1992 | Reidemeister et al. | 73/517 R |

FOREIGN PATENT DOCUMENTS 2936607  4/1981  Fed. Rep. of Germany .
2194341  3/1988  United Kingdom .

*Primary Examiner*—John E. Chapman
*Attorney, Agent, or Firm*—Sixbey, Friedman, Leedom & Ferguson

[57] ABSTRACT

The acceleration sensor has a first stationary substrate having a stationary electrode and a second stationary substrate having another stationary electrode and being opposed to the first stationary substrate with a given spacing. An electrically conductive diaphragm is disposed in the spacing and has a central segment fixed in the spacing through the pair of stationary substrates and a peripheral segment surrounding around and extending resiliently from the central segment to undergo displacement in the spacing relative to the stationary electrodes in response to an external acceleration force. The peripheral segment and the opposed stationary electrodes form variable capacitors effective to produce a capacitance change in response to the displacement of the peripheral segment to detect the external acceleration force.

12 Claims, 19 Drawing Sheets

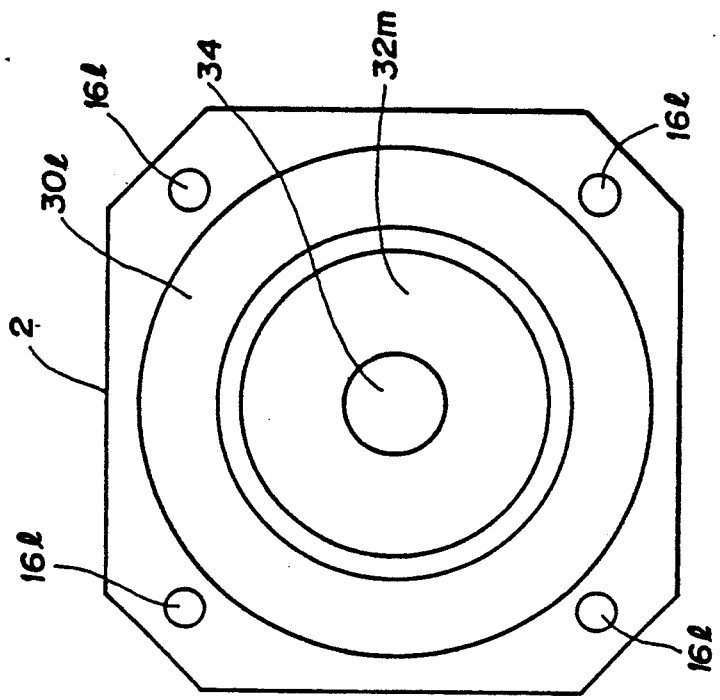
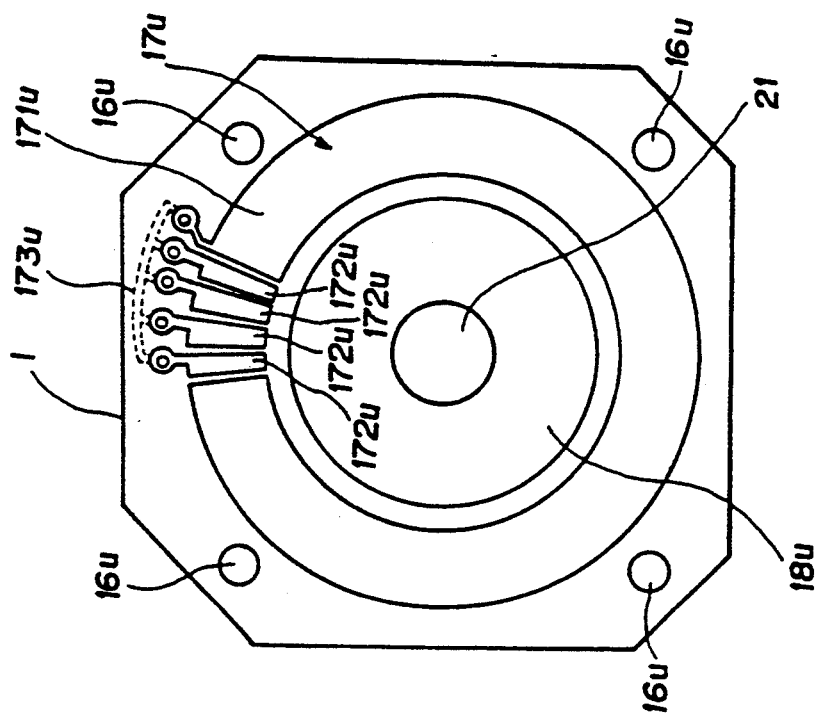
FIG.6B
FIG.6A

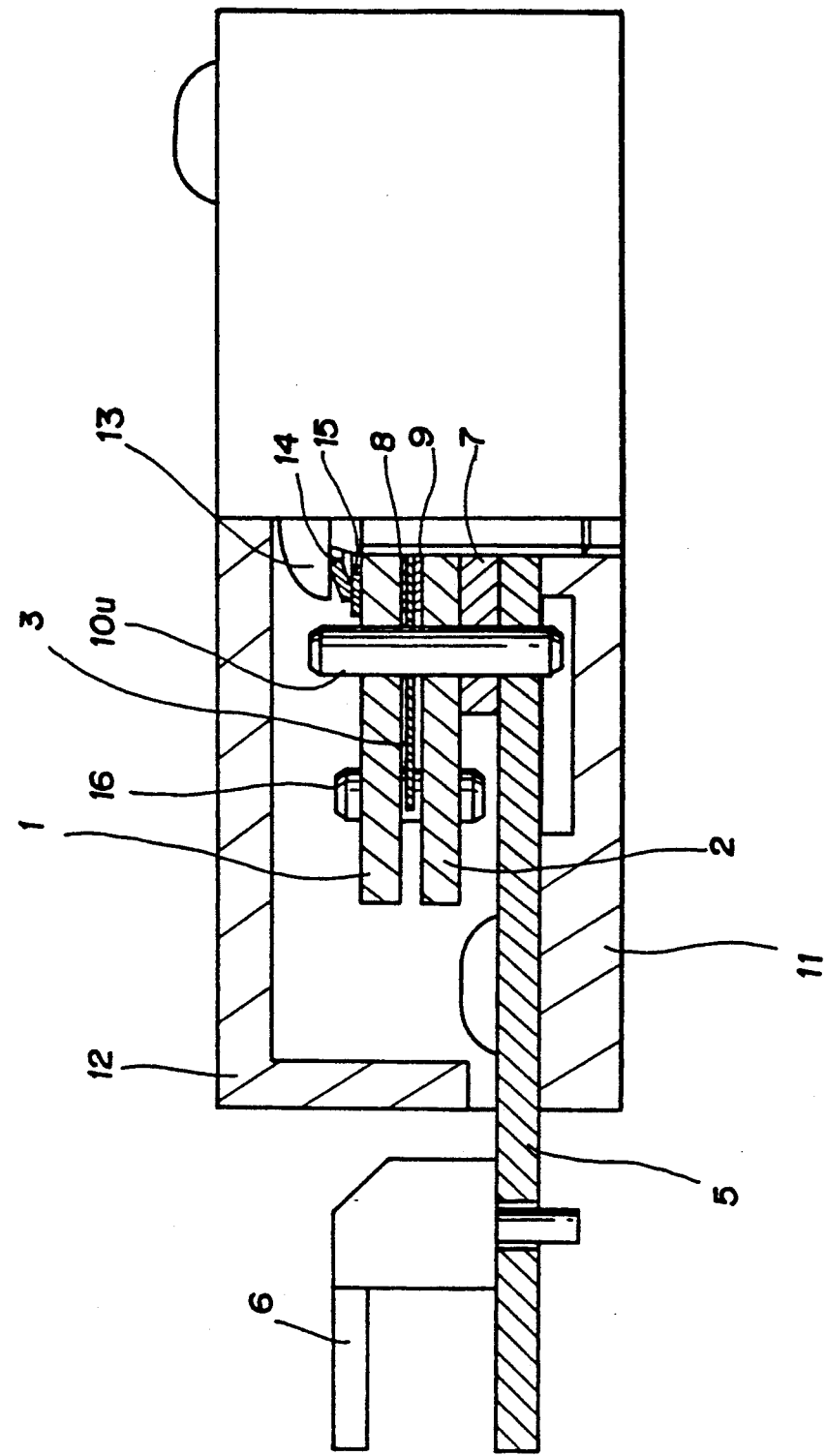

F I G. 16
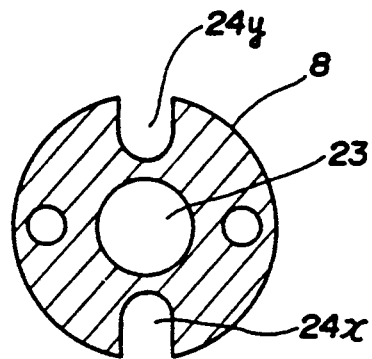
F I G. 17
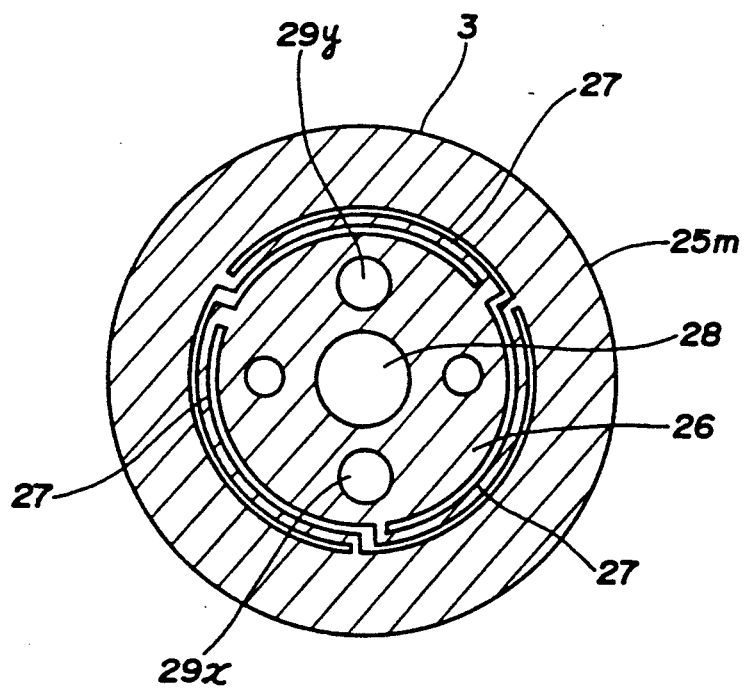

CAPACITIVE ACCELERATION SENSOR WITH FREE DIAPHRAGM

BACKGROUND OF THE INVENTION

The present invention relates to an acceleration sensor, and particularly relates to a capacitance type acceleration sensor effective to accurately detect a relatively low acceleration force below several Gs in a band range below several tens Hz. This type of acceleration sensor is mounted, for example, on a vehicle for use in automatic control of driving mechanism or braking mechanism.

Generally, a relatively high acceleration force can be easily detected by means of, for example, an acceleration sensor utilizing a piezoelectric element, or another acceleration sensor operative to electrically detect strain caused in a semiconductor piece. On the other hand, a relatively low acceleration force is difficult to sense, and a complicated structure may be required.

FIG. 24 shows an example of a conventional capacitive acceleration sensor. Such type is disclosed, for example, in U.S. Pat. No. 4,694,687. As shown in the figure, the acceleration sensor has a laminated structure composed of five layers. A pair of substrates 144 and 152 have similar metalized patterns formed on their respective concealed faces. For example, the lower substrate 152 is formed on its top surface with a frame pattern 154 along a periphery of the substrate 152 and with a rectangular pattern 158 disposed centrally of the substrate 152. These metallized patterns are electrically separated from each other by an isolation zone 156. Spacers 146 and 150 are laminated on respective one of the substrates 144 and 152. These spacers 146 and 150 are formed with central openings. An electrically conductive intermediate plate 148 is interposed between the pair of spacers 146 and 150. This intermediate plate 148 has a central movable segment 164 suported by spring members 163. The spring members 163 extend in a planar direction of the intermediate plate 148, and are formed of a slit pattern disposed around the central segment 164. By such construction, the central segment 164 is supported resiliently by a peripheral frame segment 166 of the intermediate plate 148. The above described five planar pieces are laminated with one another, and the central segment 164 and the spring members 163 are disposed in a central spacing formed in the spacers 146 and 150. The central segment 164 is supported flexibly such as to undergo displacement relative to the opposed rectangular patterns formed on the facing substrates 144 and 152. The pair of rectangular patterns and the interposed central segment constitute a pair of series-connected variable capacitors. The central segment 164 undergoes displacement relative to the stationary rectangular patterns in response to an externally applied acceleration force to cause capacitance change. This capacitance change is electrically detected to measure direction and magnitude of the applied acceleration force.

However, as shown in FIG. 24, the conventional capacitive acceleration sensor is constructed such that the central movable segment is sensitive to an acceleration force and supported around its periphery. Therefore, such construction tends to be affected by difference of thermal expansion rates of the various planar materials which constitute the laminated structure. For example, in case that the pair of stationary substrates are composed of ceramics having a thermal expansion rate of $\alpha = 0.82 \times 10^{-5}$ and the intermediate plate is composed of beryllium copper having a thermal expansion rate of $\alpha = 1.80 \times 10^{-5}$, a relative dimensional error can occur of about 0.1 $\mu$m/°C. for a total length of 10 mm. If a temperature variation is up to 40° C., there may be caused a dimensional error of 4 $\mu$m through the entire length. Such relative dimensional error may generate a stress which may induce distortion of the central segment or movable electrode, thereby causing the drawback that the detected value of an acceleration force depends on an ambient temperature.

Further, in assembling the laminated structure, opposite faces of the peripheral stationary segment of the intermediate plate are secured to the respective spacers generally by means of-an adhesive in order to uniformly distribute a stress applied to the central segment or movable electrode. The use of the adhesive may increase not only susceptivity to the ambient temperature variation, but also may disadvantageously hinder assembling work.

SUMMARY OF THE INVENTION

In view of the above mentioned problems of the prior art, an object of the present invention is to provide an improved capacitive acceleration sensor having less temperature-dependency of the acceleration detecting performance and better assembling feature.

In order to achieve the above noted object of the invention, the improved acceleration sensor is comprised of a first stationary substrate having a stationary electrode, and a second stationary substrate having another stationary electrode and being opposed to the first stationary substrate with a given spacing. An electrically conductive diaphragm is disposed in the spacing. The diaphragm has a central segment fixed and supported in the spacing, and a peripheral segment surrounding around and resiliently extending from the fixed central segment to undergo a displacement normal to the planar stationary electrodes. The peripheral movable segment and the facing stationary electrodes constitute series-connected variable capacitors. The peripheral segment operates in response to an external acceleration force to undergo a displacement, which can be electrically detected in terms of capacitance variation.

In contrast to the conventional construction, according to the invention, the intermediate diaphragm is formed with a peripheral segment in the form of, for example, an annular ring segment sensitive to an external acceleration force to undergo a responsive displacement. This peripheral segment is flexibly supported through leaf springs by the central segment, in the form of a so-called free-end support. Therefore, even if distortion is generated by ambient temperature change due to difference of thermal expansion rates among the central segment, the pair of spacers which sandwich the central segment and the pair of stationary substrates, the sensitive peripheral segment is substantially free from the distortion or stress because of its free-end support structure. Further, according to the preferred form, all of the planar components can be assembled together by a coupling member such as a screw or rivet without using adhesive, thereby facilitating the assembling work and removing the negative influence of adhesive.

BRIEF DESCRIPTION OF THE DRAWINGS

FIG. 6A is a bottom plan view of an upper stationary substrate used in a second embodiment;

FIG. 6B is a top plan view of a lower stationary substrate used in the second embodiment;

FIG. 7 is a schematic partially sectional diagram of a third embodiment of the acceleration sensor;

FIG. 16 is a plan view of a spacer;

FIG. 17 is a plan view of a diaphragm;

DETAILED DESCRIPTION OF EMBODIMENTS

First Embodiment

Figure 1:
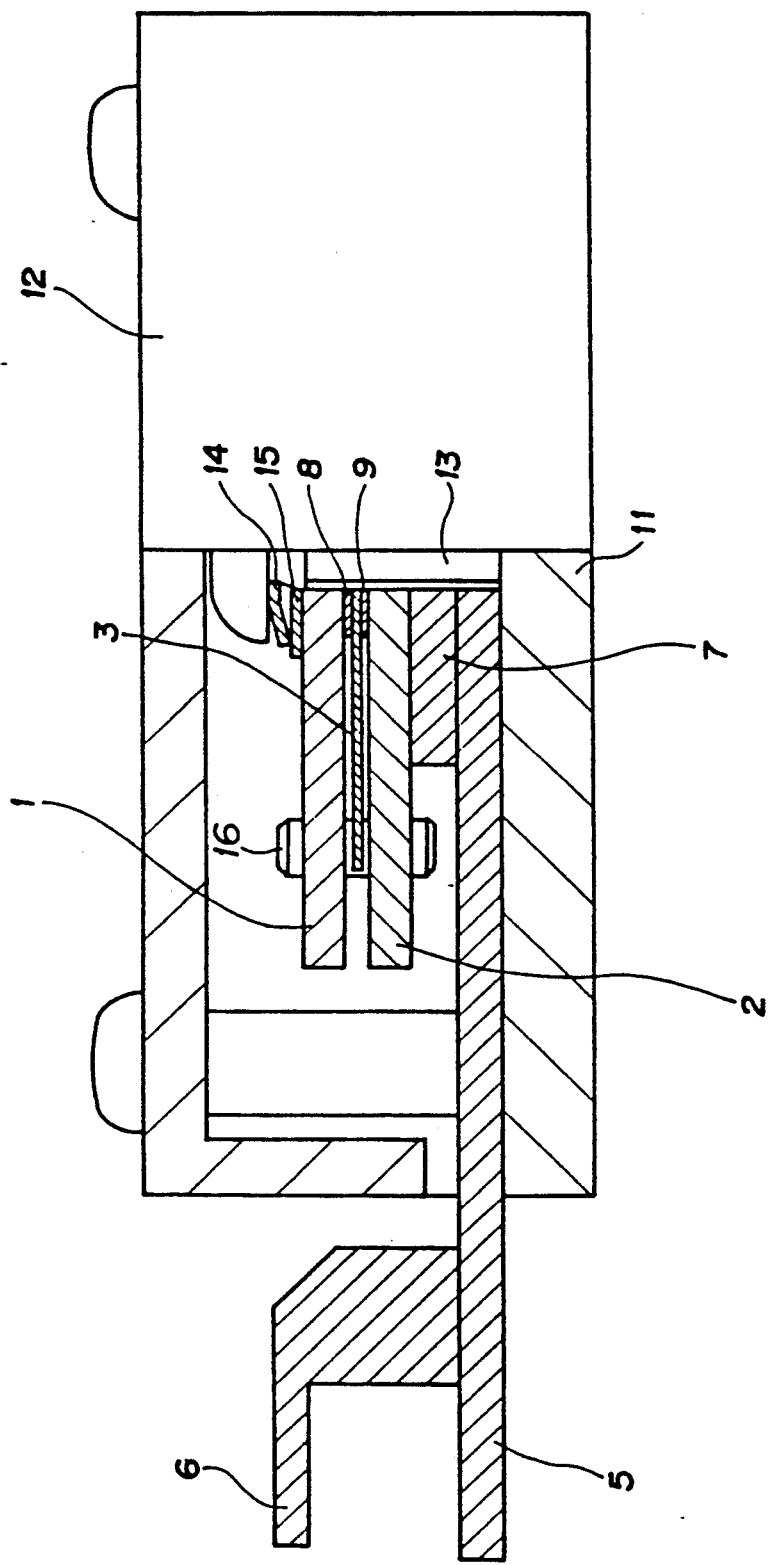
FIG. 1 is a schematic partially sectional diagram showing an overall construction of a first embodiment of the inventive acceleration sensor.

Hereinafter, preferred embodiments will be described in detail with reference to the drawings. FIG. 1 is a schematic partially sectional diagram showing an overall structure of a first embodiment of the capacitive acceleration sensor according to the invention. As shown in the figure, the acceleration sensor is comprised of a first stationary substrate 1 having on its concealed face a given planar stationary electrode, and a second stationary substrate 2 having on its concealed face another given planar stationary electrode and being opposed to the first stationary substrate 1 with a given spacing. An electrically conductive diaphragm 3 is disposed in the spacing. The diaphragm 3 is comprised of a central segment fixed and supported in the spacing, and a peripheral segment extending resiliently from the central segment to undergo a displacement in a direction perpendicular to the planar stationary electrodes within the spacing. The peripheral segment and the respective ones of the facing planar electrodes constitute series-connected variable capacitors operative to detect the displacement of the peripheral segment, which is caused in response to an external acceleration force, in terms of capacitance change.

The central segment of the diaphragm 3 is sandwiched by the first and second stationary substrates 1 and 2 through a pair of spacers 8 and 9. These of diaphragm 3, pair of spacers 8 and 9, and pair of first and second stationary substrates 1 and 2 constitute altogether a laminated structure, which is assembled together by means of a coupling member in the form of a screw 13 which vertically passes through the fixed central segment. A leaf spring piece 14 and a washer 15 are interposed between a head of the screw 13 and a top face of the first stationary substrate 1 to press down the upper substrate 1 to the lower substrate 2.

The thus constructed laminated structure is contained in a casing 11, which is enclosed by a cover 12. The cover 12 is fixed to the casing 11 by means of screws, and encloses entirely the laminated structure for electrical shielding purpose. Therefore, the casing 11 and the cover 12 are formed of metal material such as aluminium, and are electrically grounded in practical use. Further, a printed circuit board 5 is also contained in the casing 11. The laminated structure is mounted on the circuit board 5 through a junction plate 7 such that electrical lead path is provided to the pair of stationary electrodes and to the peripheral segment through the junction plate 7 and the circuit board 5 so that the variable capacitors are connected to an external drive circuit through a connecting terminal 6 mounted on an outer portion of the printed circuit board 5.

Generally, a response of the acceleration sensor is determined by displacement speed of the diaphragm 3 in the spacing. The spacing is surrounded by the pair of stationary substrates 1 and 2, and is filled with air which flows when the diaphragm 3 moves in response to an external acceleration force. Fluid resistance of the air performs damper function. In the inventive acceleration sensor, this damper function is utilized to prevent resonant destruction of the diaphragm. The damper function can be adjusted in accordance with a response frequency band needed in an individual acceleration sensor. For example, the adjustment can be effected by changing a distance between the pair of stationary substrates 1 and 2, i.e., thickness dimension of the spacers 8 and 9, or by providing in the stationary substrate a through-hole having a suitable size of opening to leak the confined air.

In the above described laminated construction, the pair of stationary substrates 1 and 2 must be coupled to each other in highly precise parallel relation in order to obtain stable detection results of the acceleration force. For this reason, the pair of stationary substrates 1 and 2 are coupled to each other through a plurality of parallel pins 16.

Figure 2:
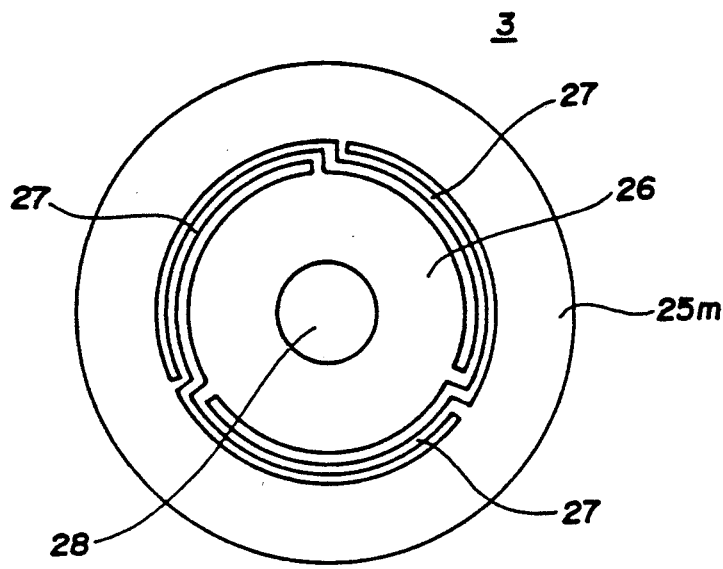
FIG. 2 is a plan view of a diaphragm which is one component of the first embodiment of the inventive acceleration sensor.
Figure 3:
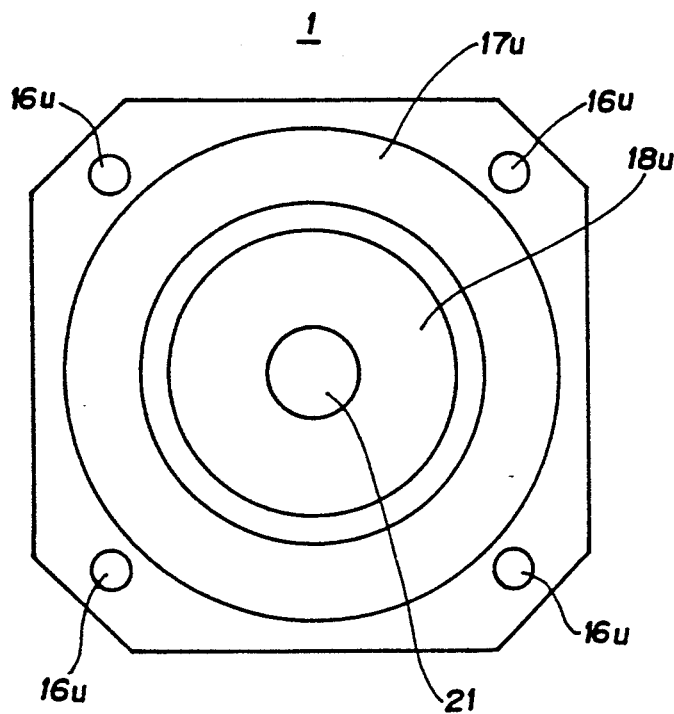
FIG. 3 is a plan view of a stationary substrate used in the first embodiment.
Figure 4:
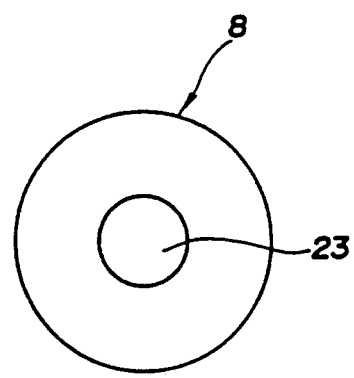
FIG. 4 is a plan view of a spacer used in the first embodiment.

Next, the detailed description is given for significant components of the first embodiment of the inventive acceleration sensor in conjunction with FIG. 2 through FIG. 4. FIG. 2 shows a planar shape of the diaphragm 3. As shown in the figure, the diaphragm 3 is comprised of a fixed central segment 26 and a movable peripheral segment 25 m which extends radially outwardly from the central segment 26 in flexible or resilient manner so as to undergo a displacement vertical to the drawing sheet. The peripheral segment 25 m constitutes a piece of movable electrode, and is formed of an annular ring which is flexibly or resiliently coupled at its inner edge portion to an outer periphery of the central disc segment 26 through three of leaf spring pieces 27. The disc segment 26 is formed centrally with an opening 28 for receiving therein the coupling screw 13 shown in FIG. 1. The planar segmented diaphragm 3 can be obtained by etching and patterning an elastic metal material such as stainless steel. In case that rust or corrosion problem may not be expected in practical use, other materials such as Cu and Be-Cu can be used to facilitate patterning process of the diaphragm.

FIG. 3 shows a planar shape of the first stationary substrate 1. The stationary substrate 1 is composed of an electrically insulating material such as ceramics, and is formed on its surface with an annular stationary electrode $17u$. For example, this annular electrode $17u$ is composed of metallized thick film coating applied by printing technology. As understood from comparison between FIG. 2 and FIG. 3, the stationary electrode $17u$ and the movable electrode $25m$ are shaped in a substantially identical pattern so that they are opposed to each other to constitute a capacitor containing a dielectric material in the form of air. The ceramic substrate 1 is formed centrally with an opening 21 for receiving therein the coupling screw 13 shown in FIG. 1. An inner annular pattern $18u$ is formed around the central opening 21. This pattern $18u$ is provided to make electrical contact with the diaphragm 3 composed of metal material. The generally rectangular substrate 1 is formed at its four corners with holes $16u$ which receive the parallel pins 16 shown in FIG. 1. Though not shown in the drawings, the second stationary substrate 2 has a similar configuration as that of the first stationary substrate 1. Electrical contact to the diaphragm 3 may be provided through at least one of the first and second stationary substrates 1 and 2 which sandwich the diaphragm 3.

FIG. 4 shows a plan view of the spacer 8. This spacer has a ring shape which is formed centrally with an opening 23 for passing therethrough the coupling screw 13. The outer shape of the spacer 8 is generally identical to that of the central segment 26 of the diaphragm 3, and is also generally identical to that of the inner disc-shape pattern $18u$ on the stationary substrate 1. The spacer 8 is composed of electrically conductive material such as metal, and is interposed between the upper stationary substrate 1 and the diaphragm 3. Though not shown in the drawings, the other spacer 9 has the same shape, and is interposed between the diaphragm 3 and the lower stationary substrate 2. The pair of spacers 8 and 9 are disposed to determine the gap dimension of the spacing in this embodiment. However, the spacers may be eliminated by using another diaphragm having a thicker dimension of the central segment and a thinner dimension of the peripheral segment.

Figure 5:
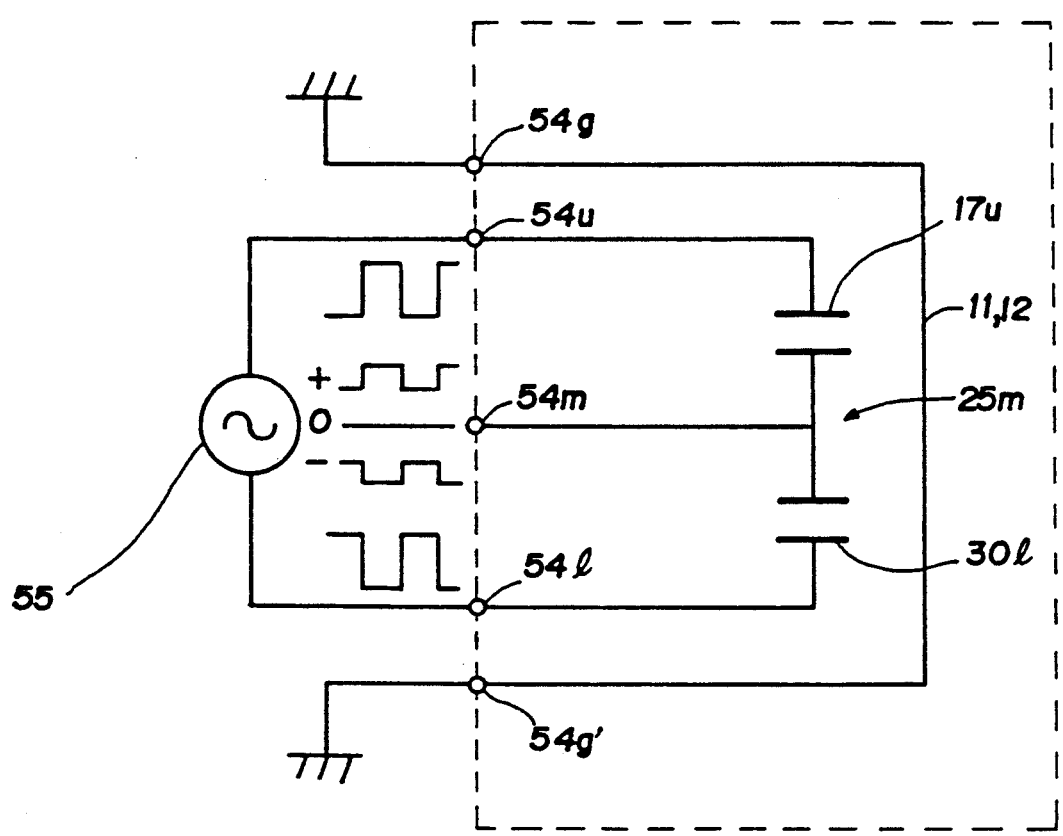
FIG. 5 is a schematic circuit diagram showing electrical connection of various components in the first embodiment of the inventive acceleration sensor.

Lastly, FIG. 5 shows electrical connection of the first embodiment of the inventive acceleration sensor. A part enclosed by the broken line indicates the sensor device, and the remaining part indicates an external driving circuit. As shown in the figure, the annular stationary electrode $17u$ formed on the upper stationary substrate 1 is electrically connected to an input terminal $54u$ through the junction plate 7 and the circuit board 5. The other annular stationary electrode $30\ l$, formed on the lower stationary substrate 2 is electrically connected to another input terminal $54l$ in similar manner. Further, the peripheral movable segment $25m$ of the diaphragm 3 is connected to an output terminal $54m$ through the spacer, the stationary substrate, the junction plate 7 and the circuit board 5. In addition, the casing 11 and the cover 12 are connected to a pair of ground terminals $54g$ and $54g$ through the printed circuit board 5. On the other hand, the external driving circuit is provided with an AC signal source 55 connectable between the pair of input terminals $54u$ and $54l$.

Referring to FIG. 5, the description is given for the operation of the first embodiment of the inventive acceleration sensor. As shown in the figure, the upper stationary electrode $17u$ and the movable electrode $25m$ constitute one variable capacitor. The capacitance thereof is determined by $C1 = \epsilon S1/d1$, where S1 denotes the electrode area, d1 denotes the electrode gap and $\epsilon$ denotes dielectric coefficient of air. On the other hand, the common movable electrode $25m$ and the other stationary electrode $30l$ constitute another capacitor. Its capacitance is determined by $C2 = \epsilon S2/d2$, where S2 denotes the electrode area and d2 denotes the electrode gap. Generally, the electrode areas S1 and S2 are dimensioned equal, and the electrode gaps d1 and d2 are provisionally adjusted identically in the absense of external acceleration force. Consequently, the series-connected pair of capacitances C1 and C2 have the identical value under the condition where no external acceleration force is applied. In such arrangemerrt, when an external acceleration a is imposed on the sensor, the movable segment $25m$ receives a dynamic force ma where m denotes the mass of movable segment $25m$, so that the movable segment $25m$ undergoes a displacement $\Delta d$ until the dynamic force is balanced by resilient force generated by the leaf spring pieces 27 which resiliently support the peripheral segment $25m$. Consequently, the gaps d1 and d2 between the movable electrode $25m$ and the respective ones of the stationary electrodes $17u$ and $30l$ are complementarily changed to $d1 + \Delta d$ and $d2 - d\Delta$. The capacitances C1 and C2 vary differentially due to the gap change to produce capacitance unbalance.

In practice, as shown in FIG. 5, the input terminal $54u$ is supplied with a square pulse signal, and the other input terminal $54l$ is supplied with another square pulse signal having 180° of phase difference. In the absence of external acceleration force, the pair of capacitors have the same capacitance value so that the output terminal $54m$ produces a zero level output voltage signal. Upon application of external acceleration force, the movable segment $25m$ undergoes a displacement according to the direction and magnitude of the applied force to thereby break the balance of capacitance values. Consequently, the output terminal $54m$ produces an output voltage signal having a particular phase corresponding to the displacement direction and a particular amplitude proportional to the displacement amount. The driving circuit operates to electrically process the phase and amplitude of the output voltage signal to monitor and display the direction and magnitude of the sensed acceleration.

As described above, according to the inventive construction of the first embodiment, the diaphragm has a fixed central segment and a movable peripheral segment. By such construction, the movable peripheral segment can be disposed in free-end support. Therefore, even if the fixed central segment is deformed or distorted in the planar direction due to thermal expansion rate difference of the laminated layers under variation of the ambient temperature, the movable segment is substantially free from such stress, thereby significantly reducing temperature-dependency of the acceleration sensor output. Further, the various plate components are coupled together to constitute the laminated structure by means of a common coupling screw or rivet, thereby facilitating assembling of the sensor device.

Second Embodiment

As described before, in the first embodiment shown in FIG. 5, the upper stationary electrode $17u$ and the movable electrode $25m$ constitute one variable capacitor. The neutral capacitance thereof is determined by $C1 = \epsilon S1/d1$, where $S1$ denotes the upper stationary electrode area, $d1$ denotes the electrode gap when the movable electrode $25m$ is placed in the neutral position and $\epsilon$ denotes dielectric coefficient of air. On the other hand, the common movable electrode $25m$ and the lower stationary electrode $30l$ constitute another capacitor. Its neutral capacitance is determined by $C2 = \epsilon S2/d2$, where $S2$ denotes the lower stationary electrode area and $d2$ denotes the electrode gap when the movable electrode $25m$ is placed in the neutral position.

Generally, the electrode gaps $d1$ and $d2$ are set to several tens $\mu$m. However, there may be variation of several $\mu$m order in a thickness dimension of the spacers and in a flatness of the diaphragm and stationary electrodes. Therefore, the actual neutral capacitances $C1$ and $C2$ deviate from a target value by several % or ten-and-several %. Therefore in the absence of any adjustment, it would be quite difficult to establish an initial balance of the pair of neutral capacitances in an individual acceleration sensor.

In view of this, a specific object of a second embodiment of the present invention is to provide an improved capacitive acceleration sensor designed to structurally achieve balance adjustment of the stable neutral capacitances. In order to achieve the above noted object, the second embodiment of the inventive acceleration sensor is basically comprised of a pair of stationary electrodes opposed to each other with a given spacing, and a movable diaphragm interposed neutrally between the pair of stationary electrodes to define a pair of capacitors having neutral capacitances according to areas of the stationary electrodes. The movable diaphragm is responsive to an external acceleration force to undergo a displacement from its neutral position. Characterizingly, at least one of the stationary electrodes is composed of an electro-conductive pattern which has an adjustable area dimension effective to balance the pair of neutral capacitances with each other. In a preferred form, the electro-conductive pattern is comprised of a main section having a fixed area dimension and a variable section which can be cut selectively from the main section.

According to the second embodiment of the invention, at least one of the stationary electrodes is comprised of the electro-conductive pattern having an adjustable area dimension. The electrode area dimension can be adjusted to balance the pair of neutral capacitances with each other. Namely, after assembling an acceleration sensor device, one neutral capacitance having a fixed value is measured in the absense of external acceleration force. Then, the other neutral capacitance is measured. Thereafter, the area dimension of the electro-conductive pattern is adjusted according to a difference in the measured capacitance values. This adjustment is carried out by trimming so that the neutral capacitances are balanced after repeating the trimming. For example, the electro-conductive pattern is comprised of a main section having a fixed area dimension, and a plurality of divided sections which are selectively cut out from the main section. The individual divided sections are cut out according to the difference in the pair of measured neutral capacitances. The value of capacitance is proportional to the electrode area. The total or initial electrode area of the adjustable pattern is set greater than the fixed electrode area of the opposed stationary electrode pattern. Therefore, the initial value of the variable neutral capacitance is normally set greater than the value of the other neutral capacitance to ensure the adjustment.

Hereinafter, the second embodiment of the present invention will be described in detail with reference to the drawings. Since the second embodiment is basically structurally similar to the first embodiment shown in FIG. 1, the description will be given specifically to characterizing features of the second embodiment. Firstly, FIG. 6A is a bottom plan view showing an inner face or a bottom face of the upper stationary substrate I. The upper substrate 1 is formed on its bottom face with an annular stationary electrode $17u$. This stationary electrode $17u$ is comprised of an electro-conductive film pattern which can be trimmed to adjust its electrode area dimension. Namely, the electro-conductive film pattern has a main section $171u$ having a fixed electrode area, and a plurality of divided sections $172u$ which can be selectively cut from the main section $171u$. The individual divided sections $172u$ are connected through through-holes to a common lead pattern $173u$ which is formed on a top surface of the substrate 1. The common lead pattern $173u$ is connected at its one end through a through-hole to the main section $171u$ which is formed on the bottom surface of the substrate 1. By such arrangement, the individual divided sections $172u$ can be selectively cut from the common lead pattern $173u$ by means of, for example, laser beam irradiation. This cutting work is carried out at the top side of the upper stationary substrate 1 to facilitate adjustment processing. A dummy pad pattern $18u$ is formed on a central portion of the bottom surface of the substrate 1. A threaded hole 21 is formed centrally through the substrate 1 for thread engagement with a coupling screw. Further, four through-holes $16u$ are formed in respective corners of the rectangular substrate 1 for receiving parallel pins.

In the above described embodiment, the adjustment of the stationary electrode area dimension is effected by selectively cutting the divided sections $172u$. However, other arrangement may be employed such that provisionally separated sections can be selectively coupled to a main section so as to effect adjustment of the electrode area dimension.

FIG. 6B is a top plan view showing an inner concealed face of the lower stationary substrate. As shown in the figure, the lower stationary substrate 2 is formed on its peripheral portion of the inner face with a lower statonary electrode $30l$. This electrode $30l$ has a given electrode area which is set smaller than the initial or total electrode area of the electro-conductive adjustable pattern. For example, in this embodiment, the annular lower stationary electrode 30*l* has an inner diameter set slightly greater than that of the annular upper stationary electrode 17*u*. As mentioned before, a capacitance is proportional to an electrode area, hence the capacitance formed by the upper stationary electrode 17*u* has initially a greater value than the other capacitance formed by the lower stationary electrode 30*l* in this embodiment. Therefore, the capacitance adjustment can be always effectively carried out by selective cutting of the divided sections 172*u*. In addition, a pad pattern 32*m* is formed on an inner central portion of the lower stationary substrate 2 and a threaded hole 34 is formed centrally of the substrate 2 for thread engagement with the coupling screw. Further, through-holes 16 are formed at four corners of the lower substrate 2 for the engagement with the parallel pins.

The above described second embodiment has an electrical construction similar to that of the first embodiment shown in FIG. 5 circuit diagram. Therefore, referring to FIG. 5 for facilitating understanding, the description is firstly given for the adjusting work of the neutral capacitances. In the assembled state, the first neutral capacitance formed between the upper stationary electrode 17*u* and the movable electrode 25*m* has generally a greater value than that of the second neutral capacitance formed between the lower stationary electrode 30*l* and the movable electrode 25*m*. At first under no external acceleration state, a capacitance is measured between the second input terminal 54*l* and the output terminal 54*m*. Next, another capacitance is measured between the first input terminal 54*u* and the same output terminal 54*m*. The upper stationary electrode 17*u* is trimmed according to difference in the measured capacitance values to finally balance the pair of capacitances with each other.

In operation, the input terminal 54*u* is supplied with a square pulse signal, and the other input terminal 54*l* is supplied with another square pulse signal having the same amplitude and 180° of phase difference through the AC signal source 55. In the absense of external acceleration force, since the movable electrode 25*m* is placed in the neutral position, the pair of capacitors have the same capacitance value so that the output terminal 54*m* produces a zero level output voltage. Upon application of external acceleration force, the movable segment 25*m* undergoes a displacement according to the direction and magnitude of the applied force to thereby break the balance of capacitance values. Consequently, the output terminal 54*m* produces an output voltage signal having a particular phase corresponding to the displacement direction and a particular amplitude proportional to the displacement amount. The driving circuit operates to electrically process the phase and amplitude of the output voltage signal to monitor the direction and magnitude of the sensed acceleration.

As described above, according to the second embodiment, at least one of the stationary electrodes is comprised of an electroconductive pattern which is formed on the stationary substrate and which has an adjustable area-dimension. The area dimension is adjusted so as to balance the pair of neutral capacitances. By such construction, the capacitive acceleration sensor has a stable neutral operating point which is substantially free from ambient temperature variation. Particularly, the electrically conductive diaphragm has a fixed central segment and a free peripheral segment to constitute a movable electrode, thereby suppressing a variation or fluctuation of the neutral point.

Third Embodiment

The following third embodiment features that a pair of stationary electrodes are formed on respective peripheral inner surfaces of a pair of stationary substrates which are opposed to each other. A diaphragm is comprised of an electrically conductive plate having a central segment and a peripheral segment resiliently coupled to the central segment. The central segment is fixed and supported between central portions of the opposed stationary substrates, and the peripheral segment or movable electrode is electrically conducted to the central segment, which electrically contacts with a junction pad pattern formed on a central portion of the inner surface of at least one of the stationary substrate.

In addition, the inventive acceleration sensor of the third embodiment has a laminated structure comprised sequentially of a circuit board formed with a circuit lead pattern for external connection, one stationary substrate, a diaphragm and another stationary substrate. The stationary electrode and the junction pad pattern are electrically connected to the circuit lead pattern by through-holed patterns forked on respective layers of the laminated structure.

According to the third embodiment of the invention, the diaphragm has a peripheral segment or movable electrode in the form of, for example, an annular segment responsive to an external acceleration force to undergo a displacement. This annular segment is held by a free-end support from the central segment of the diaphragm, and therefore is free from surrounding stress. In addition, the electrical path to the annular peripheral segment is provided through the central segment of the electrically conductive diaphragm, hence there is no need to use an additional component such as a lead wire as opposed to the prior art, thereby not hindering a response linearity of the movable electrode to an external acceleration force.

Hereinafter, the third embodiment of the invention will be described in detail with reference to the drawings. FIG. 7 is a schematic partially sectional diagram showing the third embodiment of the inventive capacitive acceleration sensor. As shown in the figure, the acceleration sensor has a pair of stationary substrates 1 and 2 opposed to one another with a given spacing. The upper stationary substrate 1 is formed on its peripheral portion of the concealed surface with one stationary electrode. The lower stationary substrate 2 is also formed on its concealed peripheral portion with another stationary electrode. A diaphragm 3 composed of a segmented electro-conductive plate is interposed between the pair of stationary substrates. This diaphragm 3 has a central segment and a peripheral segment elastically coupled to the central segment. The peripheral segment constitutes a movable electrode placed in the spacing between the pair of stationary electrodes to form a pair of capacitors, and being responsive to an external acceleration force to undergo a displacement relative to the stationary electrodes in complementary manner to cause relative capacitance change of the capacitor pair. The central segment of the diaphragm 3 is fixed between opposed central portions of the pair of stationary substrates 1 and 2. Further, the peripheral segment of diaphragm 3, i.e., the movable electrode is electrically connected to a circuit board 5 through the central segment of diaphragm 3, which is disposed in contact with a junction pad pattern formed on a concealed central portion of either of the stationary substrates 1 and 2.

The acceleration sensor is further provided with the circuit board 5 formed with a lead pattern for external electrical connection. The circuit board 5 is laminated sequentially with the lower stationary substrate 2, the diaphragm 3 and the upper stationary substrate 1 to thereby constitute a laminated structure. The movable electrode is electrically conducted to the circuit board through the central segment which is disposed in contact with the junction pad pattern formed on the concealed portion of either of the stationary substrates 1 and 2. The stationary electrode formed on the periphery of the stationary substrate and the junction pad pattern formed on the center of the stationary electrode are electrically conducted to the circuit board 5 through through-holed patterns formed on each layer of the laminated structure.

A terminal 6 is mounted on one end portion of the circuit board 5 for electrical connection to an external driving circuit. Further, a junction plate 7 formed on its top and bottom faces with a through-holed pattern is interposed between the circuit board 5 and the lower stationary substrate 2. In addition, the central segment of the diaphragm 3 is sandwiched by a pair of electrically conductive spacers 8 and 9 securely. In this embodiment, one stationary electrode formed on the concealed peripheral portion of the upper stationary substrate 1 is electrically conducted to the circuit board 5 through an electrically conductive member such as a pin 10u which passes through the laminated structure.

The laminated structure is contained in a casing 1 1 while being mounted on the circuit board 5. The casing 1 1 is enclosed by a cover 12. The laminated structure is directly fixed to the casing 11 by means of a coupling screw 13 which passes centrally through the laminated structure. In such construction, a leaf spring 14 and a washer 15 are interposed between a bottom of a head of the screw 13 and a top of the upper stationary substrate 1 so as to press together repective layers of the laminated structure. In addition, a plurality of parallel pins 16 are interconnected between the pair of stationary substrates 1 and 2 to maintain parallel relation. These parallel pins also function to suppress resonant vibration. The parallel pins 16 have a specific thermal expansion rate in matching with the spacers 8 and 9 and the diaphragm 3 so as to absorb thermal strain of the laminated structure in the vertical direction.

In the above described laminated structure, all of the electrodes are electrically conducted to the circuit board 5. The circuit board 5, junction plate 7, stationary substrates 1 and 2, spacers 8 and 9 and diaphragm 3 are pressed with one another to provide electrical conduction path. These layers of the planar members are fixed together by means of the coupling screw 13 and the leaf spring 14 to the casing 11 so as to apply stable pressure to each layer. Exceptionally, the stationary electrode formed on the concealed peripheral portion of the upper stationary substrate 1 is electrically connected to the circuit board 5 directly through the lead pin 10u so as to simplify lead pattern arrangement on the various layers. Further, the sensitive part is mounted on the circuit board 5 within the casing 11 to detect an acceleration force, while the terminal 6 or connector is disposed on the circuit board 5 outside the casing 11. Therefore, even if the connector receives a mechanical force, the sensitive part can be escaped from the affect of the mechanical force.

Figure 8A:
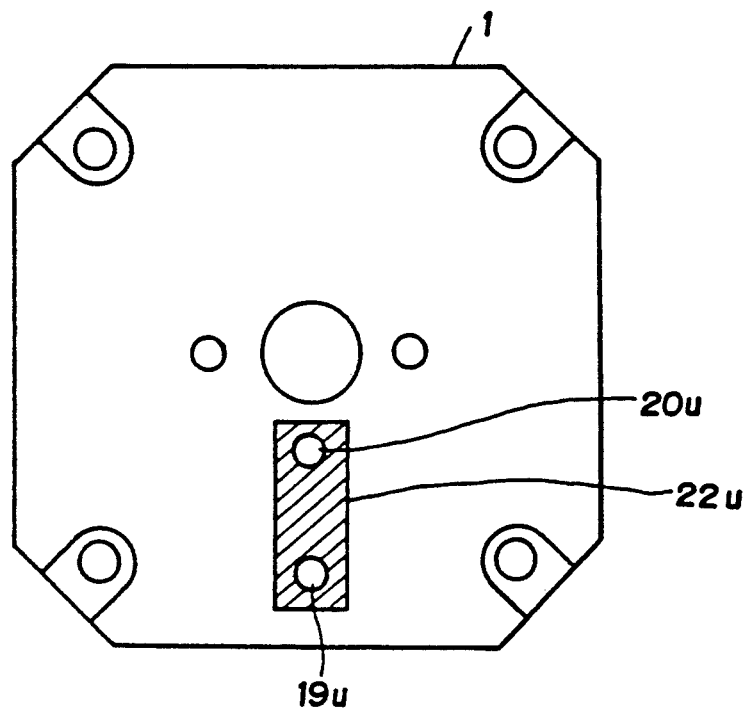
FIG. 8A is a top plan view of an upper stationary substrate used in the third embodiment.
Figure 8B:
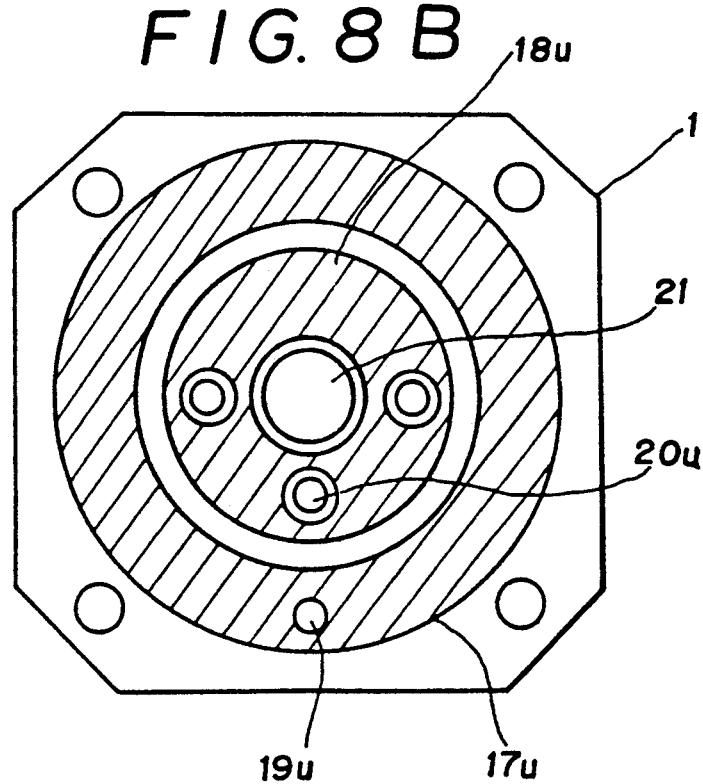
FIG. 8B is a bottom plan view of the same substrate.

Next, the description is given individually for significant components used in the inventive acceleration sensor of the third embodiment with reference to FIG. 8A through FIG. 13. Firstly, FIG. 8A and FIG. 8B show the upper stationary substrate 1. FIG. 8A is a top plan view and FIG. 8B is a bottom plan view. In the figures, the "top side" faces the cover 12 and the "bottom side" faces the casing 11. This representation will be commonly used for various planar components hereinafter. As shown in FIG. 8B, the upper stationary substrate 1 is formed on its concealed bottom surface along its periphery with an upper stationary electrode 17u of annular shape. Further, a dummy pad pattern 18u is formed on a central portion of the bottom face of the substrate 1. A metallized through-hole 19u is formed in the pattern of the upper stationary electrode 17u. A free guide hole 20u is formed in a pattern of the dummy pattern 18u for passing the lead pin 10u shown in FIG. 7. A threaded opening 21 is formed centrally in the substrate 1 for thread engagement with the coupling screw 13 shown in FIG. 7. As shown in FIG. 8A, a rectangular metallized pattern 22u is formed on the top face of the substrate 1. This rectangular pattern 22u is electrically connected to the stationary electrode 17u of the bottom side through the metallized through-hole 19u. In such construction, the lead pin 10u is inserted into the free hole 20u and a top portion of the pin 10u is soldered to the rectangular pattern 22u to establish interconnection between the pin 10u and the annular stationary electrode 17u.

Figure 9:
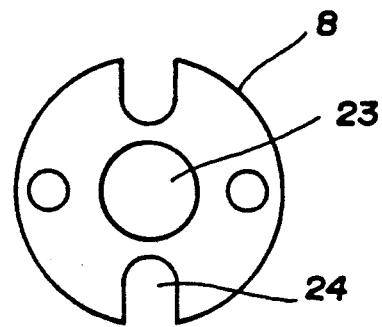
FIG. 9 is a plan view of a spacer.

FIG. 9 shows a plan view of the spacer 8. The spacer 8 is formed centrally with an opening 23 for passing therethrough the coupling screw 13, and is formed peripherally with a recess 24 for clearing the lead pin 10u. The spacer 8 is composed of electrically conductive material. Although not shown in the drawings, the other spacer 9 has the same shape and construction.

Figure 10:
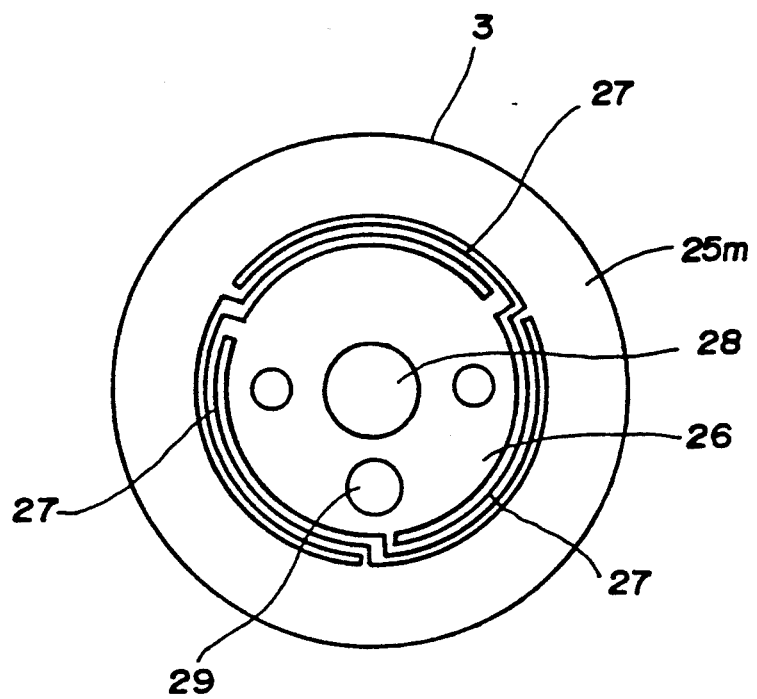
FIG. 10 is a plan view of a diagraphm.

FIG. 10 shows a plan view of the diaphragm 3. This member 3 is composed of elastic metal material such as beryllium copper or stainless steel, and is comprised of an annular peripheral segment 25m and a central segment 26. The peripheral segment 25m is supported resiliently by the central segment 26 through a plurality of leaf spring pieces 27. Therefore, when fixing the central segment 26, the peripheral segment 25m responds freely to a vertical component of an external acceleration force to undergo a vertical displacement proportionally to the magnitude of the acceleration force. The fixed central segment 26 is formed centrally with an opening 28 for passing therethrough the coupling screw 13. In addition, a free hole 29 is also formed to clear the pin 10u. Further, the central segment 26 has an outer diameter which is substantially identical to that of the spacer 8. This central segment 26 is sandwiched by the pair of spacers 8 and 9.

Figure 11A:
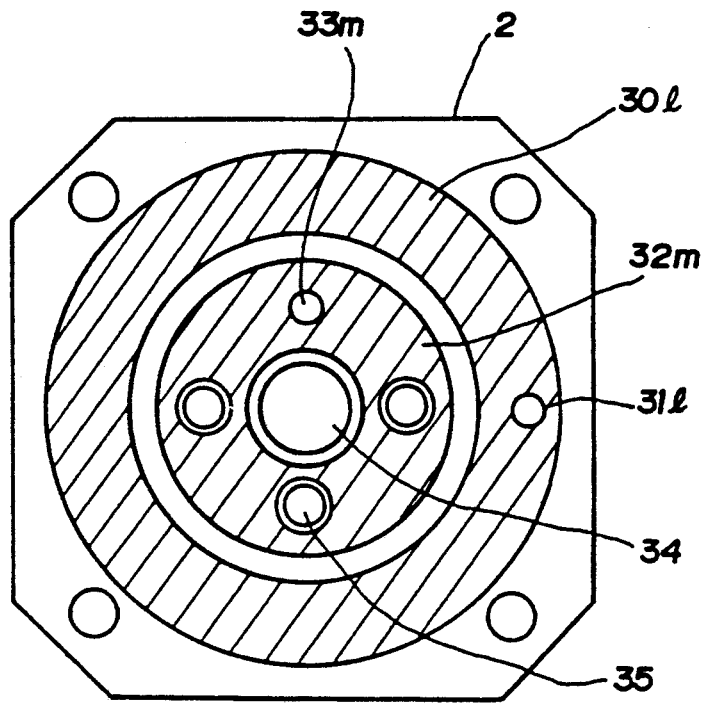
FIG. 11A is a top plan view of a lower stationary substrate.
Figure 11B:
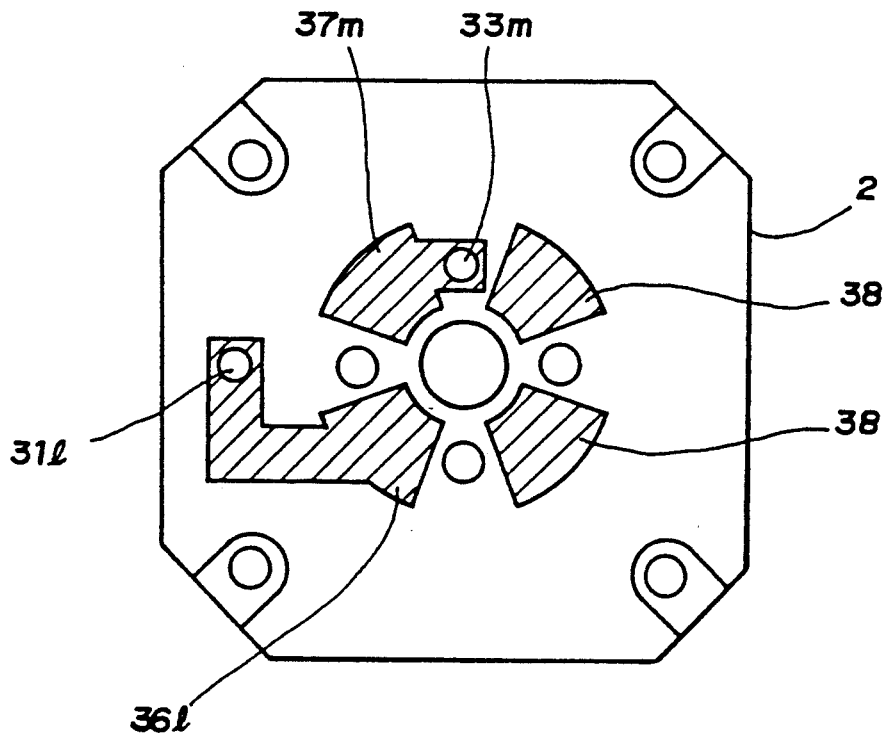
FIG. 11B is a bottom plan view of the same substrate.
Figure 12:
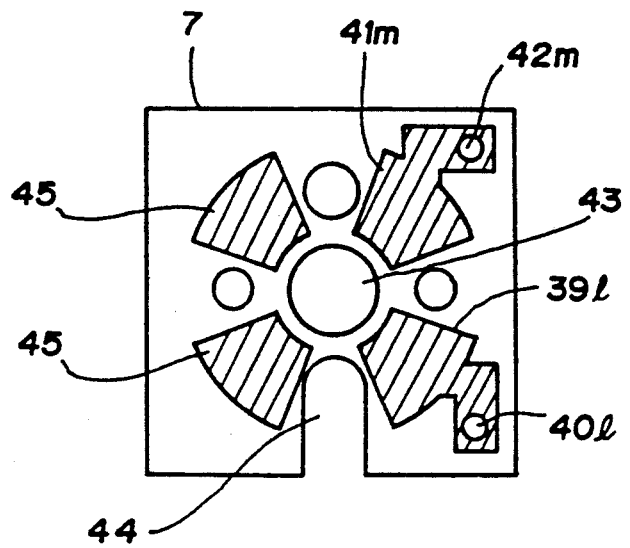
FIG. 12A is a top plan view of a junction plate.
FIG. 12B is a bottom plan view of the same plate.
Figure 12:
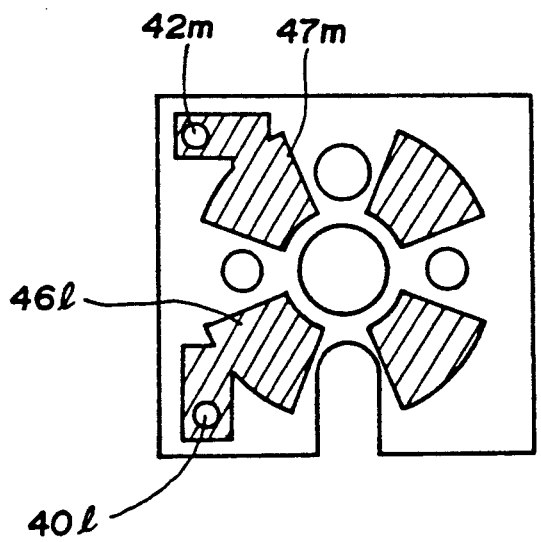

FIGS. 11A and 11B show a shape of the lower stationary substrate 2. FIG. 11A is a top plan view, and FIG. 11B is a bottom plan view. As shown in FIG. 11A, the substrate 2 is formed on its top face along its periphery with an annular lower stationary electrode 30l. A metallized through-hole 31l is formed to conduct with the lower stationary electrode pattern. Further, a disc-like junction pad 32m is formed centrally on the top face of the substrate 2. This junction pad 32m is made in electrical contact with the central segment 26 of the diaphragm 3 through the spacer 9. A metallized through-hole 33m is formed to conduct with the junction pad pattern 32m. In addition, the substrate 2 is formed on its central portion with a threaded hole 34 in thread engagement with the coupling screw 13, and with a free hole 35 for passing the pin 10u. As shown in FIG. 11B, a lead pattern 36l is formed on the bottom face of the substrate 2, and is electrically conducted to the lower stationary electrode 30l by the through-hole 31l. Further, there is formed another lead pattern 37m which is electrically connected through a through-hole 33m to the junction pad 32m formed on the top face. Additionally, a pair of dummy patterns 38 are formed on the bottom face.

FIG. 12A shows a top plan view of the junction plate 7, and FIG. 12B shows a bottom plan view of the same plate. As shown in the figures, the junction plate 7 is formed on its top face with a lead pattern 39l which contains a metallized through-hole 40l. The plate 7 is formed with another lead pattern 41m which contains a metallized through-hole 42m. The junction plate 7 has in its central portion an opening 43 for passing the coupling screw 13 and a recess 44 for clearing the lead pin 10u. Additionally, a pair of dummy patterns 45 are formed on the junction plate 7. The lead pattern 39l is disposed in face-to-face contact with the corresponding lead pattern 36l formed on the bottom face of the lower stationary substrate 2. The other lead pattern 41m is disposed similarly in face-to-face contact with the corresponding lead pattern 37m formed on the bottom face of the lower substrate 2. As shown in FIG. 12B, the junction plate 7 is formed on its bottom face with a lead pattern 46l which is electrically conducted to the top lead pattern 39l through the metallized through-hole 46l. The junction plate 7 has another bottom lead pattern 47m which is electrically conducted to the top lead pattern 41m by the through-hole 42m.

Figure 13:
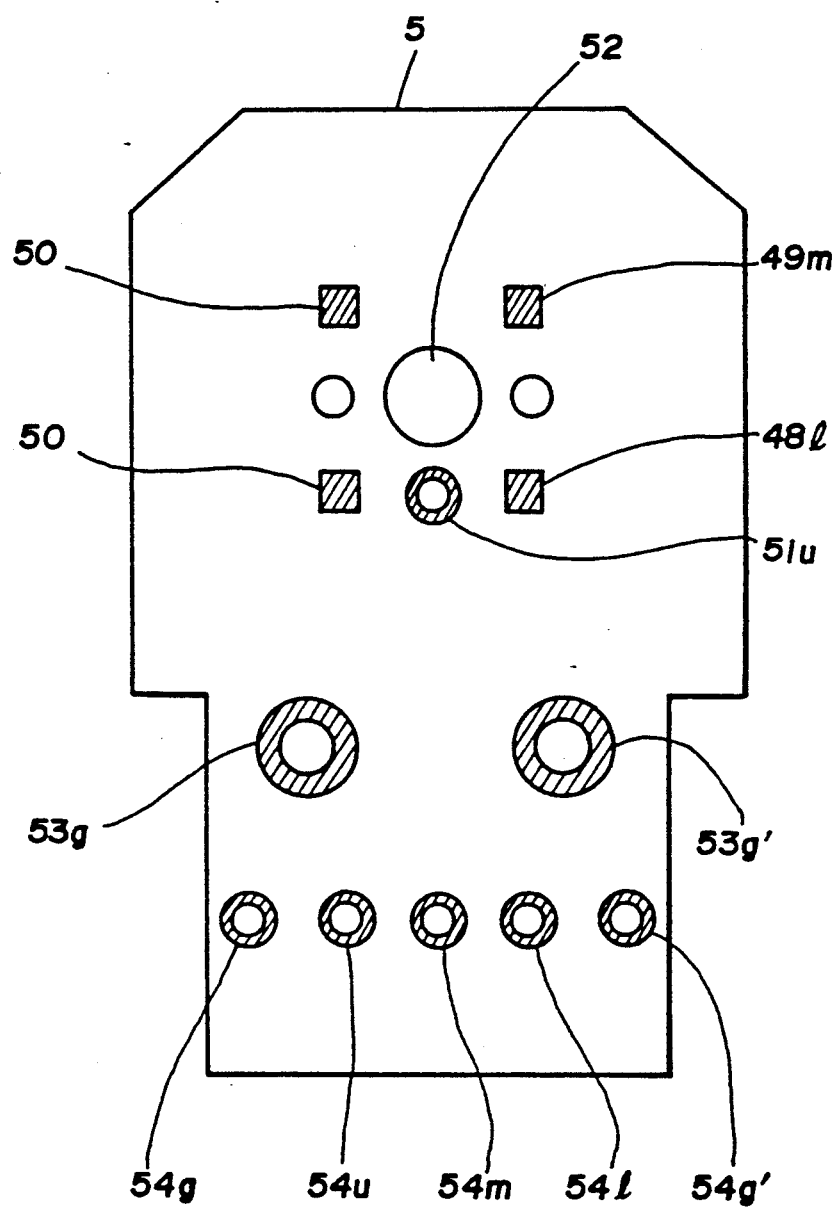
FIG. 13 is a top plan view of a circuit board.

Lastly, FIG. 13 shows a top plan view of the circuit board. As shown in the figure, the circuit board 5 is provided with pad patterns 48l and 49m on its concealed portion which is disposed inside the casing 11. The pad, pattern 48l is arranged in face-to-face contact with the corresponding lead pattern 46l formed on the bottom face of the junction plate 7. The other pad pattern 49m is arranged similarly in face-to-face contact with the opposed lead pattern 47m formed on the bottom face of the junction plate 7. A pair of dummy pads 50 are formed additionally. Further, the circuit board 5 has a metallized through-hole 51u which is disposed in engagement with the lead pin 10u. A threaded opening 52 is formed centrally in the circuit board 5 for thread engagement with the coupling screw 13. Further, there is formed a pair of through-holes 53g and 53g' through which the circuit board 5 is fixed to the casing 11. Five through-hole land patterns 54u, 54l, 54m, 54g and 54g' are formed on an exposed part of circuit board 5, which is disposed outside the casing 11. The connecting terminal 6 or connector shown in FIG. 7 is soldered to these metallized through-hole land patterns. Though not shown in the figure, the circuit board 5 is formed on its bottom face with lead patterns through which the pad pattern 48l connects to the through-hole land pattern 54l, the through-hole pattern 51u connects to the through-hole land pattern 54u, the pad pattern 49m connects to the through-hole land pattern 54m, the through-hole pattern 53g connects to the through-hole land pattern 54g, and the through-hole pattern 53g' connects to the through-hole land pattern 54g'.

The electrical connection of the electrodes of the FIG. 7 embodiment is basically identical to that of the first embodiment shown in FIG. 5. Therefore, referring to FIG. 5 for the explanation purpose, an enclosed part by the broken line indicates the sensor device, and the remaining part indicates an external driving circuit. As shown in the figure, the upper stationary electrode 17u is connected to the corresponding through-hole land pattern 54u formed on the circuit board 5 through a sequential path of the through-hole 19u, rectangular lead pattern 22u, guide opening 20u, lead pin 10u and through-hole pattern 51u. The lower stationary electrode 30l is connected to the corresponding terminal pattern 54l through a sequential path of the through-hole 31l, lead pattern 36l, lead pattern 39l, through-hole 40l, lead pattern 46l, and lead pattern 48l. The movable electrode 25m is connected to the corresponding terminal pattern 54m sequentially through a path of the leaf spring pieces 27, central segment 26 of the diaphragm 3, spacer 9, junction pad pattern 32m, through-hole 33m, lead pattern 37m, lead pattern 41m, through-hole 42m, lead pattern 47m and lead pattern 49m. The casing 11 and the cover 12 are electrically connected to the pair of terminal patterns 54g and 54g'. This connection is carried out by fixing the circuit board 5 to the casing 11 through the pair of through-holes 53g and 53g' by means of screws.

The inventive acceleration sensor is particularly suitable for detecting accurately a relatively low acceleration force below several Gs in an operation band below several tens Hz while being mounted on, for example, vehicle. Therefore., the sensor device is normally treated like ordinary electronic components, and therefore it requires moisture-resistant and corrosion-resistant construction. In view of this, the diaphragm is preferably composed of stainless steel. The lead pin should be metallized by tin in order to secure firm electrical connection. The lead patterns and through-hole land patterns formed on the planar members should be coated by tin or gold. The cover and casing should be coated by aluminium oxide film. Further, after assembling an acceleration sensor device, moisture-resistant silicone resin might be preferably filled in spacings between the cover and casing and the circuit board to seal the sensor device.

As described above, according to the third embodiment of the invention, planar members are laminated with one another, and are fixed together by pressure to the casing through a common coupling screw, thereby advantageously facilitating assembling work. In addition, the electrical lead from the movable electrode is provided through lead patterns formed on top and bottom faces of the planar members and metallized through-holes, thereby advantageously removing an external stress which would be caused when using a lead wire connection as in the prior art construction.

In the above described third embodiment, lead patterns interconnected by metallized through-holes are formed on top and back faces of each planar member which constitutes the laminated construction. The electrical connection is provided through face-to-face contact of opposed lead patterns between the layers. However, the lead or pad pattern and the land pattern surrounding a through-hole have different film thickness due to processing treatment on the same plane. Therefore, if adjacent planar members were superposed with one another without regard to this film thickness difference, there would be caused a drawback that an accurate parallel arrangement could not be ensured between the layers. When an error is contained in a parallel arrangement of the laminated structure, detection accuracy of acceleration force may be disadvantageously impaired. Particularly, the movable electrode 5 cannot be accurately set in a neutral position under no acceleration state, thereby causing offset.

In view of this, in the third embodiment, a land pattern of each metallized through-hole is disposed in noncontact relation to a face of an opposed layer. Stated otherwise, the before-mentioned inter-layer facial contact is made between only opposed lead patterns, while the land pattern of each through-hole is offset from an opposed lead or pad pattern. Therefore, even if the land pattern has a film thickness greater than that of the lead pattern, their difference does not actually affect performance of the sensor. Generally, lead or pad patterns can be formed with uniform thickness over the entire surface of a planar member, so that parallel relation between adjacent layers can be ensured at highly accurate degree. Accordingly, declination of the movable electrode can be eliminated relative to the stationary electrodes, thereby producing a detection output having good linearity to an external acceleration force.

In detail, as shown in FIG. 11B, a first lead pattern 36$l$, a second lead pattern 37$m$ and two dummy patterns 38 are formed on the bottom face of the substrate 2 around the central opening 34. These four pad patterns have the uniform film thickness, and the dummy patterns 38 are particularly provided to ensure a uniform contact balance for the facial contact to an opposed surface of an over layer. The first lead pattern 36$l$ is electrically conducted to the stationary electrode 30$l$ through the metallized through-hole 31$l$. A land pattern around the metallized through-hole 31$l$ is disposed remotely from the first arcuate pad pattern 36$l$. The second lead pattern 37$m$ is electrically conducted to the junction pad 32$m$ formed on the top face of the substrate 2, through the metallized through-hole 33$m$. A land pattern surrounding the through-hole 33$m$ is disposed remotely from the arcuate pad pattern 37$m$. These land patterns are raised especially at edges of the through-hole opening, and therefore have a film thickness greater than those of the arcuate pad patterns.

Further, as shown in FIG. 12A, the junction plate 7 is formed on its top face with a first arcuate pad pattern 39$l$ which is conducted to the bottom side-through a metallized through-hole 40$l$. The plate 7 is formed also with a second arcuate pad pattern 41$m$ which is conducted to the back side through a metallized through-hole 42$m$. Additionally, a pair of dummy pad patterns 45 are formed on the junction plate 7. These four arcuate pad patterns correspond to those formed on the back face of the lower stationary substrate 2, and are placed in facial contact therewith. Namely, the first pad pattern 39$l$ of the junction plate 7 is disposed in face-to-face contact with the corresponding pad pattern 36$l$ formed on the back face of the lower stationary substrate 2. In this arrangement, since the through-hole 40$l$ is positioned away from the pad pattern 39$l$, it does not contact with the facing pad pattern 36$l$. In similar manner, a land pattern formed on the same face of the pad pattern 36$l$ around the through-hole 31$l$ is also positioned remotely from the opposed pad pattern 39$l$. Namely, the face-to-face contact is made only between the pad patterns 36$g$ and 39$l$ having uniform thickness, while the land patterns around the through-holes 31$l$ and 40$l$ are disposed to escape from the facial contact.

Further, as shown in FIG. 13, a first rectangular pad pattern 49$m$ formed on the top face of the circuit board 5 makes facial contact with the pad pattern 47$m$ formed on the back face of the junction plate 7. In this arrangement, a land pattern extends from the pad pattern 47$m$ around the through-hole 42$m$, and is disposed free of contact from the rectangular pad pattern 49$m$. Further, the second pad pattern 48$l$ is made in facial contact with the other arcuate pad pattern 46$l$ formed on the back face of the junction plate 7. In similar manner, a land pattern extends from the arcuate pad pattern 46$l$ around the through-hole 40$l$. This land pattern is disposed free of contact with the rectangular pad pattern 48$l$.

As described above, according to the third embodiment of the invention, a land pattern of each through-hole is disposed in noncontact with an opposed face of an over layer. Therefore, adjacent layers can be uniformly laminated with one another, while eliminating affect of protrusion of the land pattern to secure highly parallel degree of the laminated construction, thereby effectively improving linearity of the acceleration sensor output and removing offset thereof.

Fourth Embodiment

The previously described capacitive acceleration sensors can detect only a uniaxial acceleration force or a linear acceleration component externally applied normal to the stationary electrodes, but cannot detect an angular acceleration component externally applied around a given rotation axis. However, it would be desired to detect concurrently a linear acceleration component and an angular acceleration component in some uses of the sensor. In view of this, a specific object of the fourth embodiment of the present invention is to provide an improved capacitive acceleration sensor operative to concurrently detect linear and angular acceleration components. In order to achieve the object, the fourth embodiment of the inventive acceleration sensor is comprised of a pair of stationary substrates opposed to each other in a given direction of a linear axis with a given spacing. One set of two stationary electrodes are formed on a concealed face of one stationary substrate and they are divided from each other along a rotation axis orthogonal to the linear axis. Another set of two stationary electrodes are formed on a concealed face of the other stationary substrate and they are opposed in registration with said one set of stationary electrodes to constitute each pair of the two opposed stationary electrodes. A movable electrode composed of an electrically conductive plate is interposed between the one set of stationary electrodes and the other set of stationary electrodes. The movable electrode is responsive to a linear accleration component along the linear axis and to an angular acceleration component around the rotation axis to undergo a displacement.

According to the above described construction, a horizontal set of two variable capacitors are formed between the movable electrode and one set of the two coplanar stationary electrodes. When an external angular acceleration force is applied around a horizontal rotation axis, the movable electrode is angularly displaced to generate a capacitance difference in the horizontal set of variable capacitors. The external angular acceleration force is detected in terms of polarity and magnitude of the capacitance difference. On the other hand, a vertical pair of two variable capacitors are formed between the movable electrode and one pair of two opposed stationary electrodes. When an external linear acceleration force is applied along a vertical linear axis, the movable electrode is linearly displaced to generate a capacitance difference in the vertical pair of variable capacitors. The external linear acceleration force is detected in terms of polarity and magnitude of the capacitance difference. Thus, the angular and linear acceleration forces can be detected concurrently.

Figure 14:
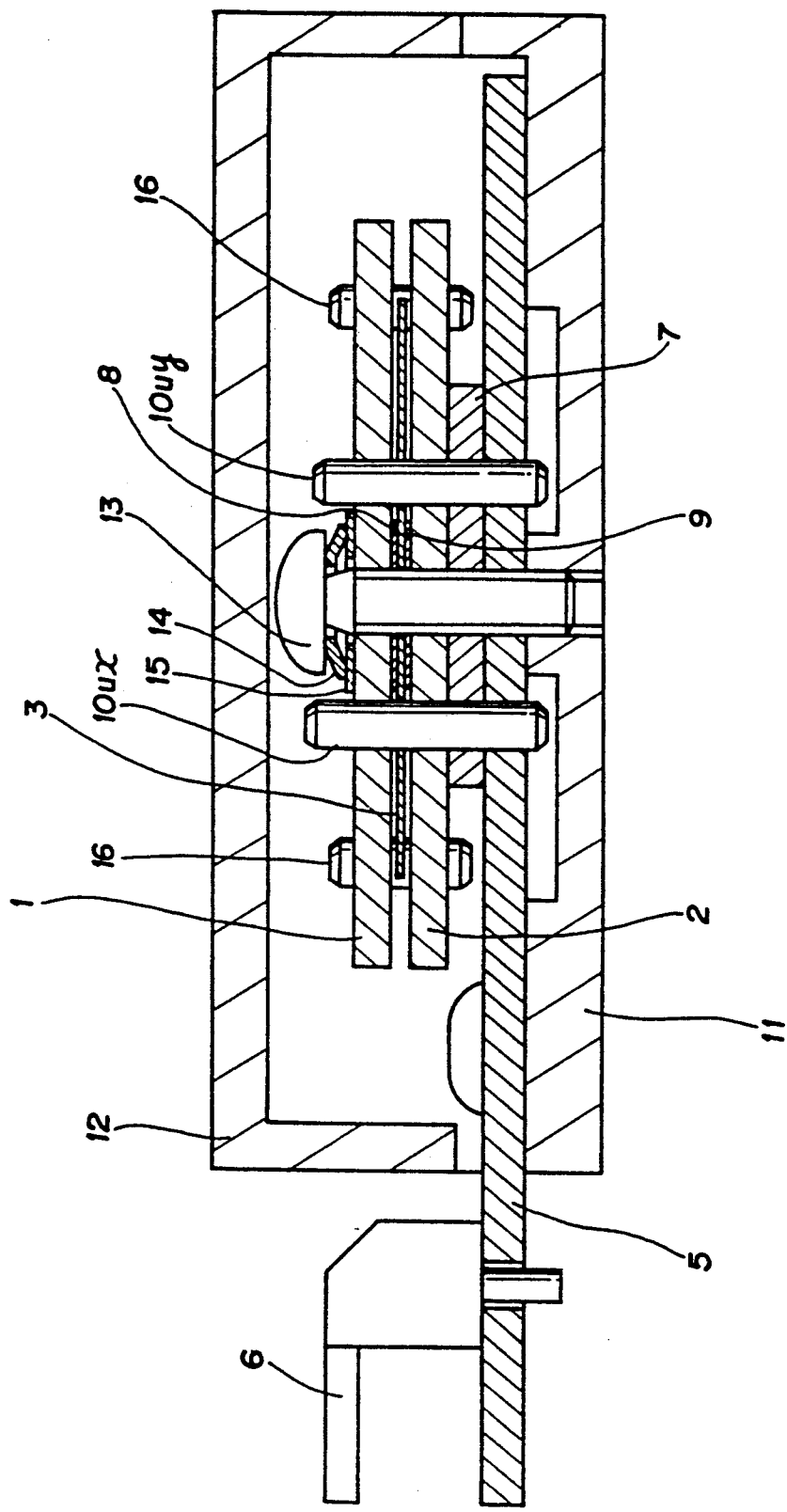
FIG. 14 is a schematic sectional diagram of a fourth embodiment of the acceleration sensor.

Hereinafter, the fourth embodiment of the invention will be described in detail with reference to the drawings. FIG. 14 is a schematic sectional diagram showing the fourth embodiment of the inventive acceleration sensor. As shown in the figure, the acceleration sensor has a pair of stationary substrates 1 and 2 opposed to one another in a direction of a given vertical linear axis with a given spacing. The upper stationary substrate 1 is formed on its peripheral portion of the concealed suface with one set of two stationary electrodes. This set of stationary electrodes are divided from one another along a given horizontal rotation axis. The lower stationary substrate 2 is also formed on its concealed peripheral face portion with another set of two stationary electrodes. Said another set of the stationary electrodes are opposed in registration individually with said one set of the stationary electrodes to constitute each vertical pair of two stationary electrodes. A diaphragm 3 composed of a segmented electro-conductive plate is interposed between the pair of stationary substrates 1and 2. This diaphragm 3 has a fixed central segment and a peripheral segment elastically coupled to the central segment. The peripheral segment constitutes a movable electrode which is responsive to an angular acceleration force around the rotation axis and to a linear acceleration force along the linear axis to undergo displacement relative to the stationary electrodes.

The acceleration sensor is further provided with a circuit board 5 formed with a lead pattern for external electrical connection. The circuit board 5 mounts thereon a terminal 6 for external connection, and is laminated sequentially with the lower stationary substrate 2, the diaphragm 3 and the upper stationary substrate 1 to thereby constitute a laminated structure. In this embodiment, a junction plate 7 is additionally interposed between the lower stationary substrate 2 and the circuit board 5. Some of the stationary electrodes and the movable electrode are electrically conducted to the terminal 6 for the external connection through throughholed patterns formed on each layer of the laminated structure.

The central segment of the diaphragm 3 is sandwiched by a pair of electrically conductive spacers 8 and 9 securely between the pair of stationary substrates 1 and 2. In this embodiment, one set of the two stationary electrodes formed on the concealed portion of the upper stationary substrate 1 are electrically conducted to the circuit board 5 directly through pins 10ux and 10uy in order to simplify the arrangement of lead patterns on the layers. The laminated structure is contained in a casing 11 while being mounted on the circuit board 5. The casing 11 is enclosed by a cover 12. The laminated structure is directly fixed to the casing 11 by means of a coupling screw 13 which passes centrally through the laminated structure along the vertical linear axis. In such construction, a leaf spring 14 and a washer 15 are interposed between a bottom of a head of the screw 13 and a top face of the upper stationary substrate 1 so as to press together respective layers of the laminated structure. In addition, a plurality of parallel pins 16 are interconnected between the pair of stationary substrates 1 and 2 to maintain parallel relation.

Figure 15A:
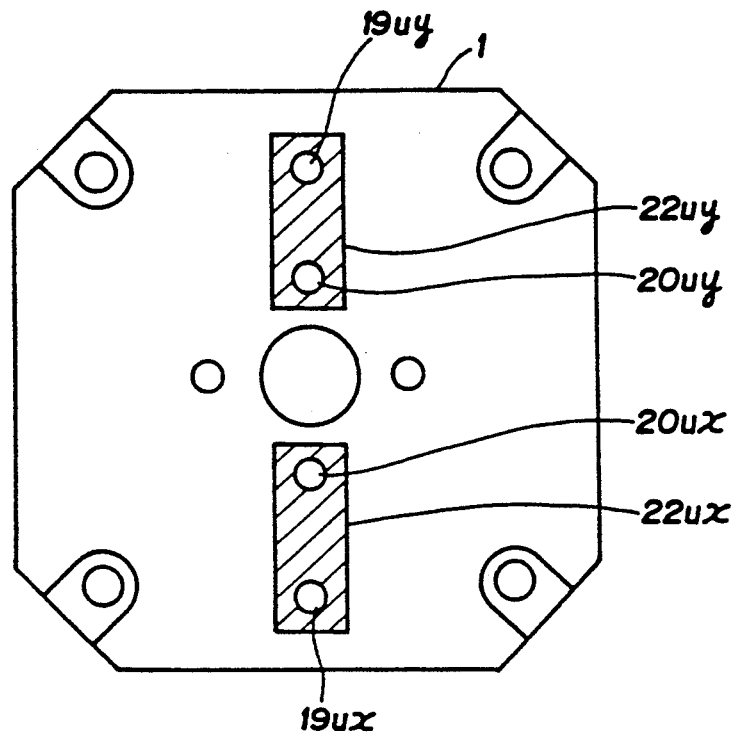
FIG. 15A is a top plan view of an upper stationary substrate used in the fourth embodiment.
Figure 15B:
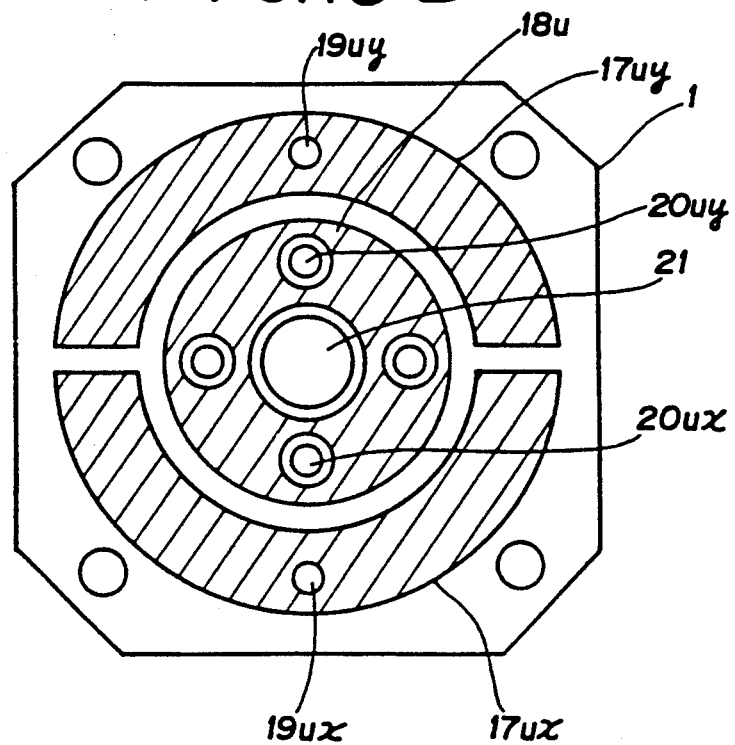
FIG. 15B is a bottom plan view of the same substrate.

Next, the description is given individually for significant components used in the fourth embodiment of the inventive acceleration sensor with reference to FIG. 15A through FIG. 20. FIG. 15A and FIG. 15B show the upper stationary substrate 1. FIG. 15A is a top plan view and FIG. 15B is a bottom plan view. In the figures, the "top side" faces the cover 12 and the "bottom side" faces the casing 11. This representation will be commonly used for various planar components hereinafter. As shown in FIG. 15B, the upper stationary substrate 1 is formed on its bottom or back surface along its periphery with one set of upper stationary electrodes in an annular shape. This set is comprised of two stationary electrodes 17ux and 17uy which are separated from each other along a given horizontal rotation axis orthogonal to a given vertical linear axis which is normal to the drawing sheet. Further, a dummy pad pattern 18u is formed on a central portion of the back face of the substrate 1. A metallized through-hole 19ux is formed in the pattern of the upper stationary electrode 17ux. Similarly, another metallized through-hole 19uy is formed in a pattern of the other stationary electrode 17uy. In addition, through-holes 20ux and 20uy are formed in a pattern of the dummy pad pattern 18u for passing the lead pins 10ux and 10uy, respectively. A threaded opening 21 is formed centrally in the substrate 1 for thread engagement with the coupling screw 13. Further, four openings are formed at respective corners of the rectangular substrate 1 for the engagement with the parallel pins 16.

As shown in FIG. 15A, rectangular metallized patterns 22ux and 22uy are formed on the exposed top face of the substrate 1. This rectangular lead pattern 22ux is electrically connected to the stationary electrode 17ux of the back side through the metallized through-hole 19ux. The other stationary electrode 17uy is electrically conducted to the other rectangular lead pattern 22uy. In such construction, the lead pin 10ux is inserted into the free hole 20ux and a top portion of the pin 10ux is soldered to the rectangular lead pattern 22ux. The other lead pin 10uy is inserted into the corresponding free hole 20uy, and is soldered to the other rectangular lead pattern 22uy.

FIG. 16 shows a plan view of the spacer 8. The spacer 8 is formed centrally with an opening 23 for passing therethrough the coupling screw 13, and is formed peripherally with recesses 24x and 24y for clearing the respective lead pins 10ux and 10uy.

FIG. 17 shows a plan view of the diaphragm 3. This member 3 is comprised of an annular peripheral segment 25m and a central segment 26. The peripheral segment 25m is supported resiliently by the central segment 26 through a plurality of leaf spring pieces 27, in the form of a free-end support to constitute the movable electrode. Therefore, when fixing the central segment 26, the peripheral segment 25m can undergo a vertical linear displacement along the linear axis and can undergo an angular or banking displacement around the rotation axis. The central segment 26 is formed centrally with an opening 28 for passing therethrough the coupling screw 13. In addition, free holes 29x and 29y are formed separately to clear the pins 10ux and 10uy. The central segment 26 has an outer diameter which is substantially identical to that of the spacer 8. This central segment 26 is sandwiched by the pair of spacers 8 and 9 so that the movable electrode 25m is electrically conducted to the spacer 9 through the leaf spring pieces 27.

Figure 18A:
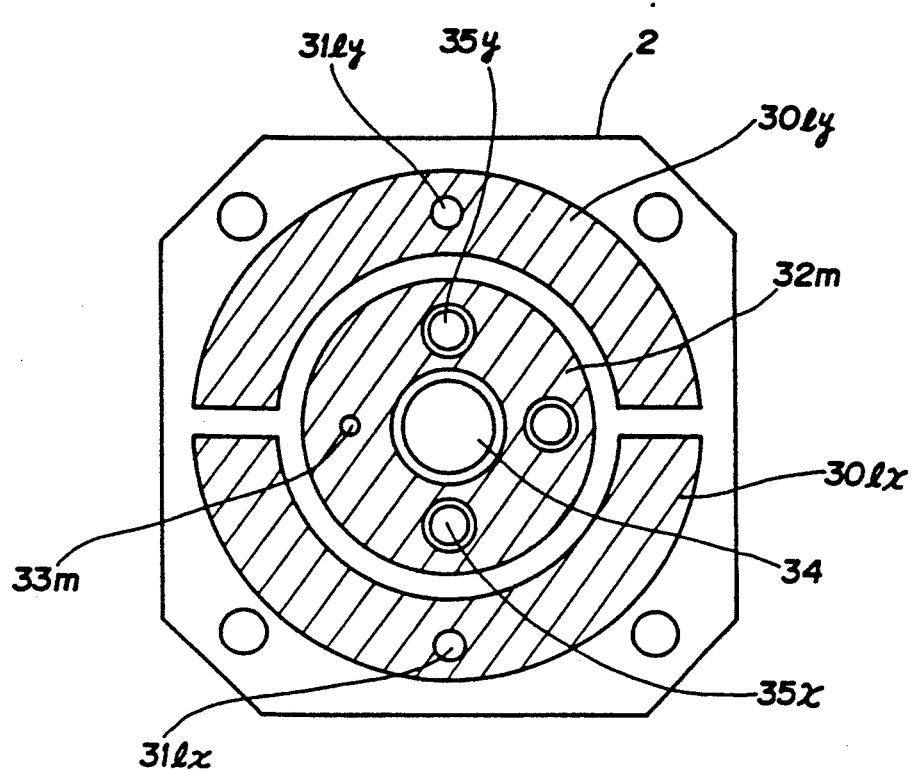
FIG. 18A is a top plan view of a lowre stationary substrate.
Figure 18B:
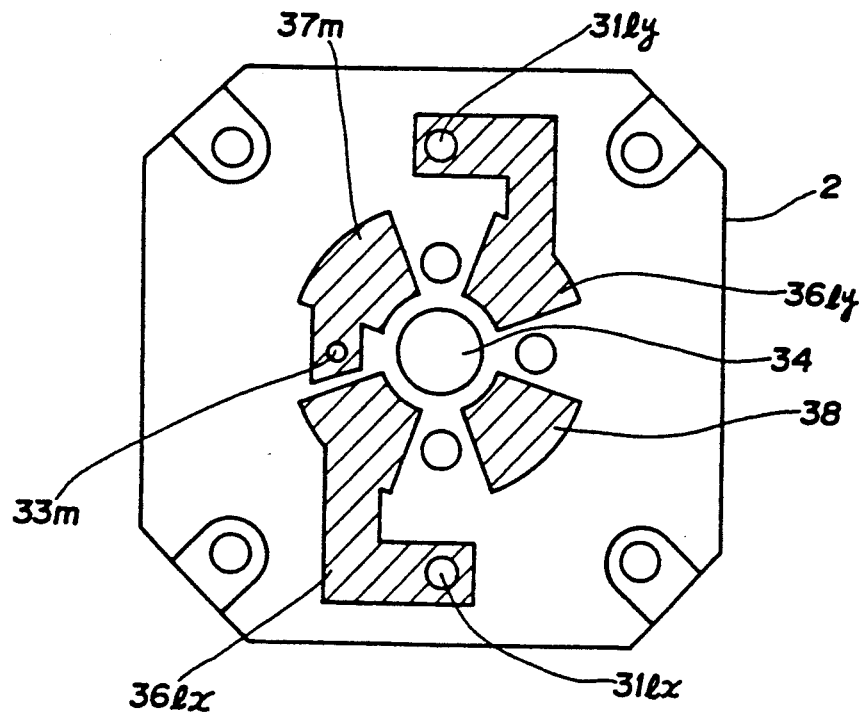
FIG. 18B is a bottom plan view of the same substrate.

FIG. 18A is a top plan view of the lower stationary substrate 2, and FIG. 18B is a bottom plan view thereof. As shown in FIG. 18A, the substrate 2 is formed on its concealed top face along its periphery with one annular set of two lower stationary electrodes 30lx and 30ly which are divided by the rotation axis. A metallized through-hole 31ly is formed in the lower stationary electrode 30lx, and another metallized through-hole 31ly is formed in the other lower stationary electrode 30ly. The lower stationary electrode 30lx is opposed in registration with the upper stationary electrode 17ux to form one vertical pair. In similar manner, the other lower stationary electrode 30ly is opposed in registration with the corresponding upper stationary electrode 17uy to form another vertical pair.

Further, a disc-like junction pad pattern 32m is formed centrally on the top face of the substrate 2. This junction pad pattern 32m is made in facial contact with the spacer 9 to provide electrical connection to the movable electrode 25m. A metallized through-hole 33m is formed to conduct with the junction pad pattern 32m. In addition, the substrate 2 is formed on its central portion with a threaded hole 34 for thread engagement with the coupling screw 13, and with free holes 35x and 35y for passing the respective lead pins 10ux and 10uy. Further, the substrate 2 is formed at its four corners with openings for the engagement with the parallel pins 16. These openings correspond to those formed on the upper stationary substrate 1. The parallel pins 16 are used to secure the parallel arrangement of the substrates.

As shown in FIG. 18B, the substrate 2 is formed on its bottom surface with a first pad pattern 36lx, second pad pattern 36ly, third pad pattern 37m and a fourth dummy pad pattern 38 around the central opening 34. These four pad patterns have the uniform film thickness, and the dummy pad pattern 38 is particularly provided to ensure uniform contact balance to an opposed face of an under layer member. The first pad pattern 36lx is electrically conducted to the stationary electrode 30lx formed on the top face of the substrate 2, through the through-hole 31lx. The second pad pattern 36ly is conducted to the other stationary electrode 30ly by the through-hole 31ly. The third pad pattern 37m is conducted to the junction pad 32m formed on the top face of the substrate 2, through the through-hole 33m.

Figure 19A:
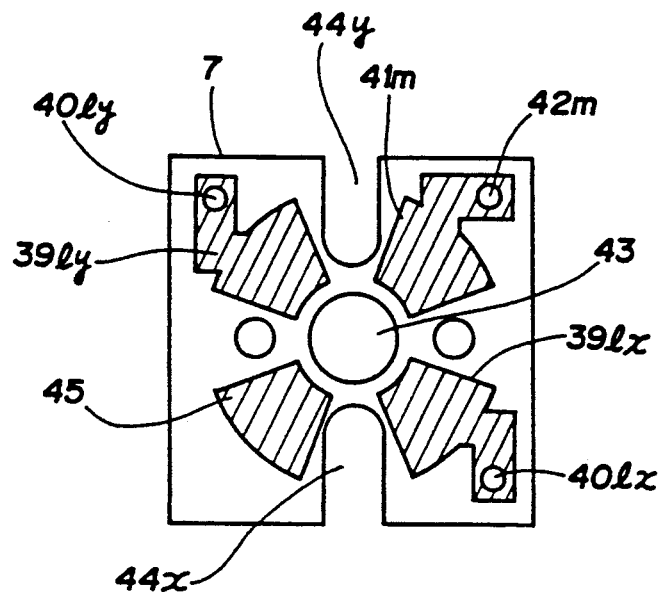
FIG. 19A is a top plan view of a junction plate.
Figure 19B:
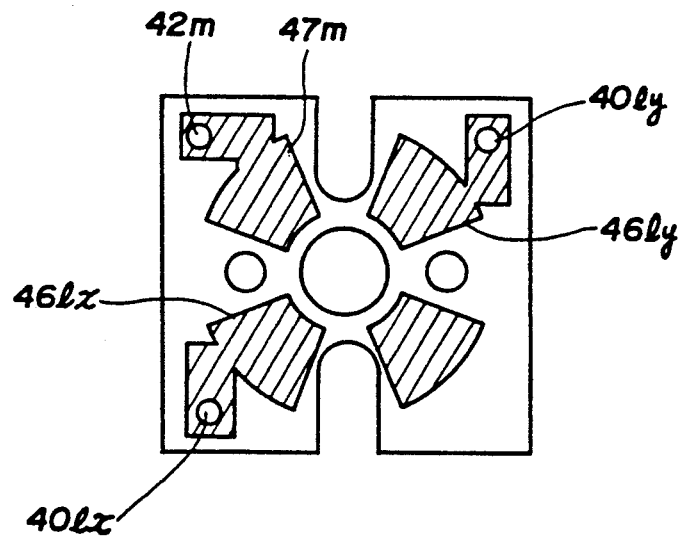
FIG. 19B is a bottom plan view of the same plate.

FIG. 19A shows a top plan view of the junction plate 7, and FIG. 19B shows a bottom plan view of the same plate. As shown in the figures, the junction plate 7 is formed on its top face with a first arcuate pad pattern 39lx which is conducted to the back side by a metallized through-hole 40lx. A second arcuate pad pattern 39ly is also formed and electrically conducted to the back side by a through-hole 40ly. The plate 7 is further formed with a third pad pattern 41m which is conducted to the back side by a metallized through-hole 42m. Additionally, a fourth dummy pad pattern 45 is formed on the junction plate 7. These four arcuate pad patterns correspond to those formed on the back face of the lower stationary substrate 2 in face-to-face contact. Namely, the first pad pattern 39lx of the junction plate 7 is disposed in face-to-face contact with the corresponding pad pattern 36lx formed on the bottom face of the lower stationary substrate 2. Similarly, the second pad pattern 39ly is disposed in facial contact with the corresponding pad pattern 36ly, the third pattern 41m is in face-to-face contact with the corresponding pad pattern 37h, and the dummy pad pattern 45 is in facial contact with the corresponding dummy pad pattern 38. The junction plate 7 has in its central portion an opening 43 for passing the coupling screw 13, and diametrically separated recesses 44x and 44y for clearing the lead pins 10ux and 10uy.

As shown in FIG. 19B, the junction plate 7 is formed on its back face with four arcuate pad patterns. Among them, a pad pattern 46lx is electrically conducted to the top pad pattern 39lx through the metallized through-hole 40lx. Another pad pattern 46ly is electrically conducted to the second pad pattern 39ly on the top side through the through-hole 40ly, and a further pad pattern 47m is electrically conducted to the third lead pattern 41m on the top side by the through-hole 42m. The remaining arcuate pad pattern is dummy.

Figure 20:
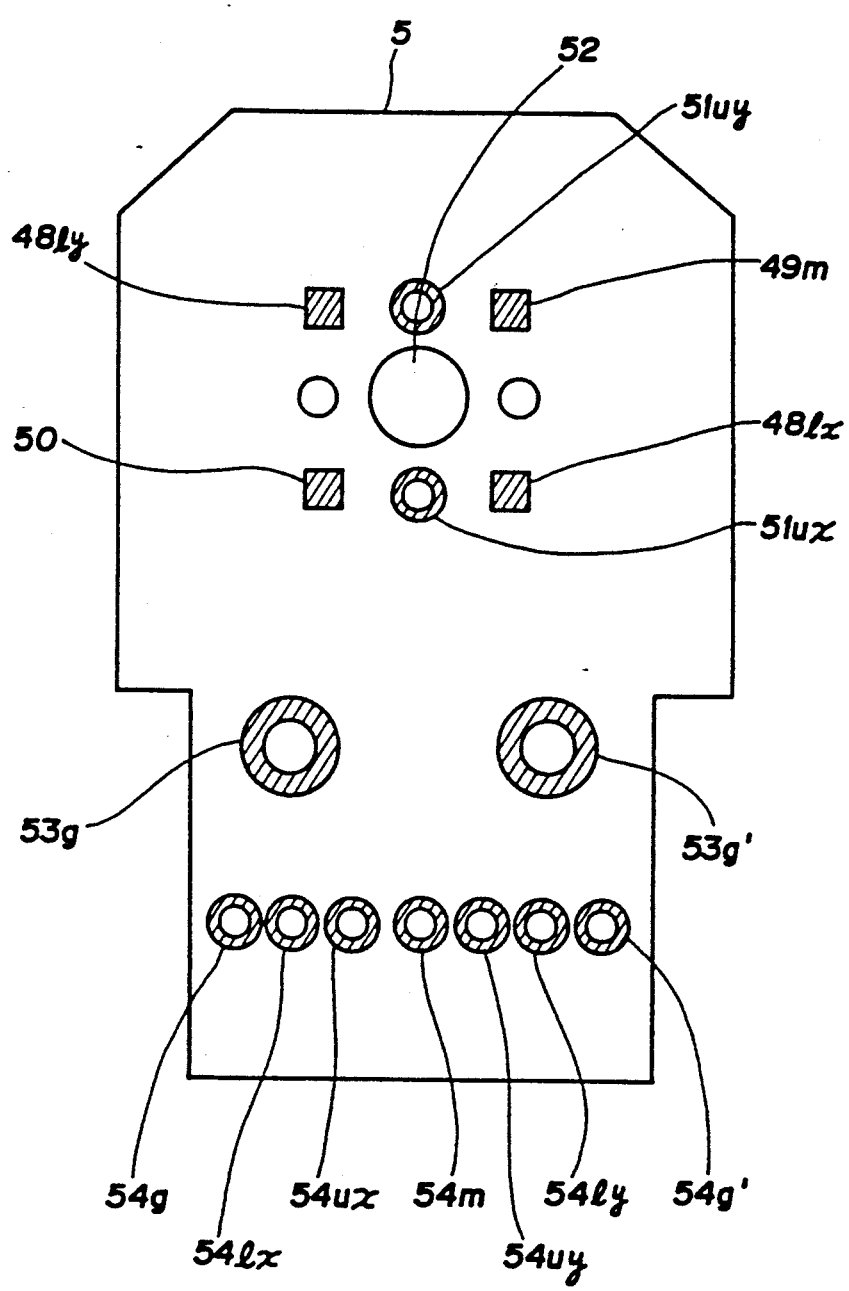
FIG. 20 is a top plan view of a circuit board.

FIG. 20 shows a top plan view of the circuit board 5. As shown in the figure, the circuit board 5 is provided with four square pad patterns on its concealed portion which is disposed inside the casing 11. The first square pad pattern 48lx is arranged in face-to-face contact with the corresponding lead pattern 46lx formed on the back face of the junction plate 7. The second square pad pattern 48ly is in facial contact with the arcuate pad pattern 46ly formed on the bottom face of the junction plate 7. The third square pad pattern 49m is arranged similarly in face-to-face contact with the opposed arcuate pad pattern 47m formed on the back face of the junction plate 7. A fourth dummy pad pattern 50 is formed additionally. Further, the circuit board 5 has metallized through-holes 51ux and 51uy which are disposed in engagement with the lead pins 10ux and 10uy for soldered electrical connection. A threaded opening 52 is formed centrally in the circuit board 5 for thread engagement with the coupling screw 13. Further, there are formed a pair of through-holes 53g and 53g' through which the circuit board 5 is fixed to the casing 11. Seven through-hole land patterns 54ux, 54uy, 54lx, 54ly, 54m, 54g and 54g' are formed on an exposed part of circuit board 5, which is disposed outside the casing 11. The connecting terminal 6 or connector is soldered to these metallized through-hole land patterns. Though not shown in the figure, the circuit board 5 is formed on its bottom face with lead patterns through which the pad pattern 48lx connects to the through-hole land pattern 54lx, the pad pattern 48ly connects to the through-hole land pattern 54ly, the through-hole pattern 51ux connects to the through-hole land pattern 54ux, the through-hole pattern 51uy connects to the through-hole land pattern 54uy, the pad pattern 49m connects to the through-hole land pattern 54m, the through-hole pattern 53g connects to the through-hole land pattern 54g, and the through-hole pattern 53g' connects to the through-hole land pattern 54g'.

Figure 21:
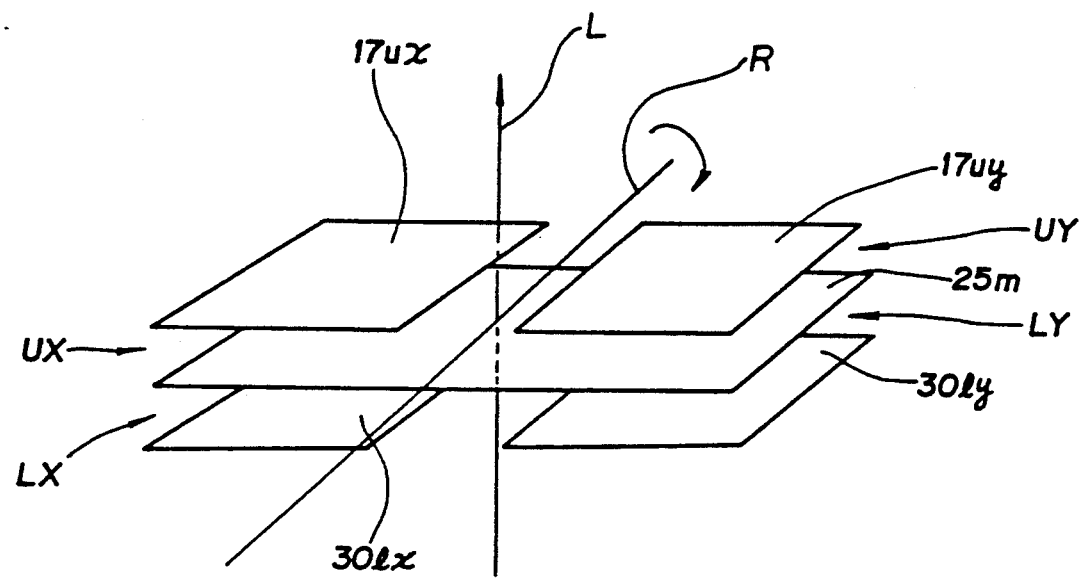
FIG. 21 is a schematic diagram showing a positional arrangement of stationary and movable electrodes in the fourth embodiment.
Figure 22:
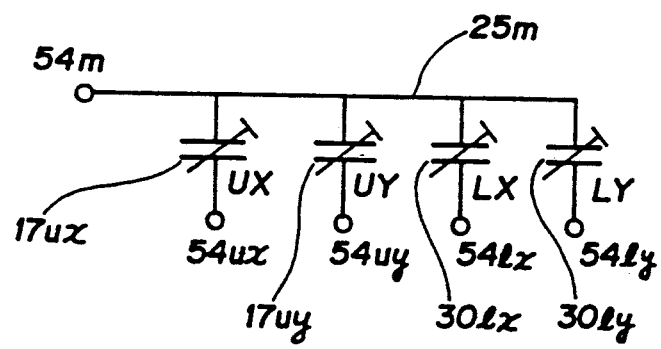
FIG. 22 is a schematic circuit diagram showing connection of a plurality of capacitors.
Figure 23:
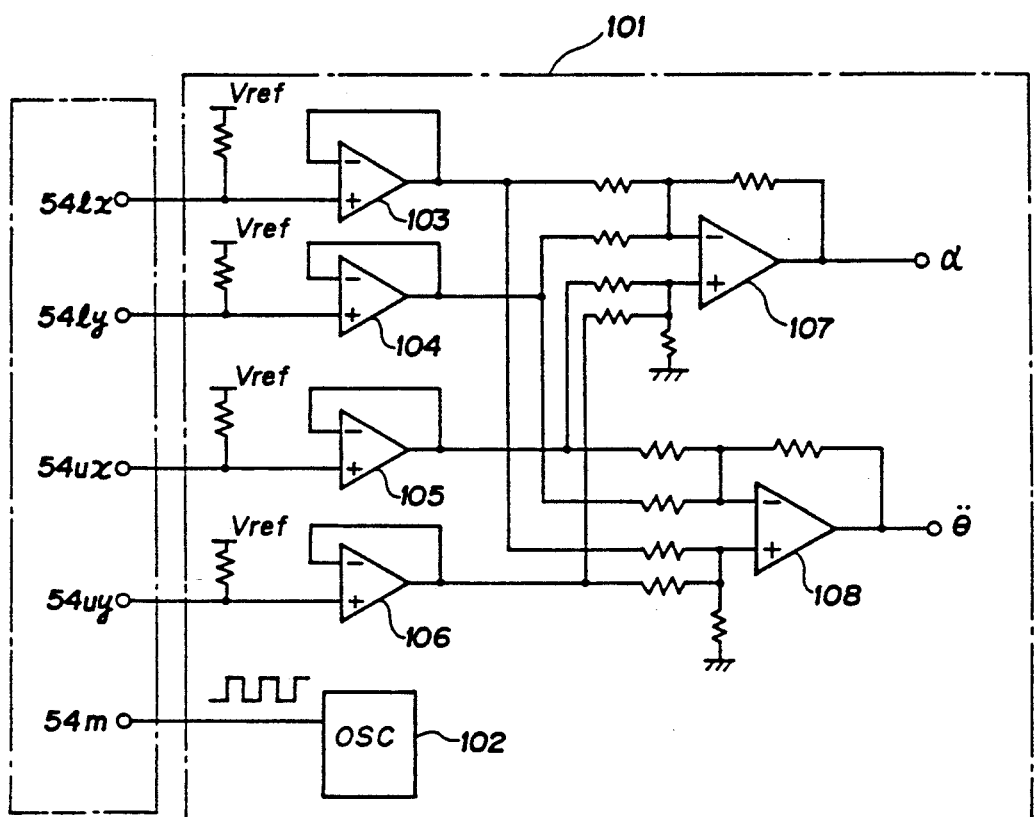
FIG. 23 is a circuit diagram of a processing circuit which can be connected to the fourth embodiment of the acceleration sensor.
Figure 24:
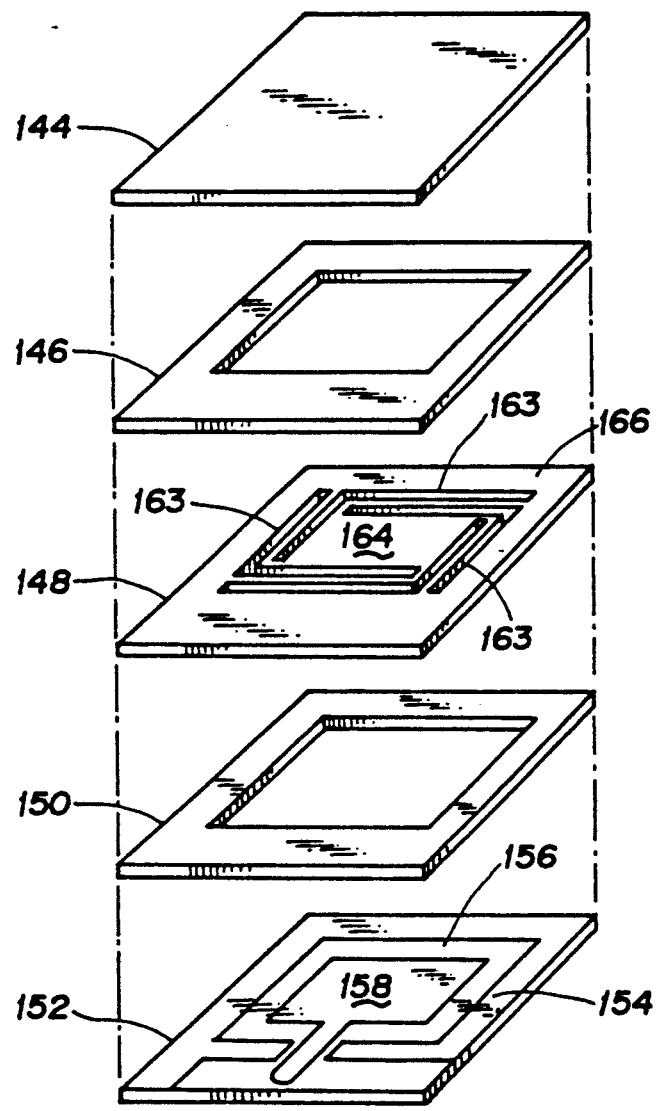
FIG. 24 is a exploded view of the conventional acceleration sensor.

Lastly, the detailed description is given for the operation of the fourth embodiment of the inventive acceleration sensor with reference to FIGS. 21 through 23. FIG. 21 is a schematic diagram showing relative positioning of the stationary electrodes and the movable electrode. These electrodes are represented in rectangular shapes in order to facilitate understanding in the figure, although the actual electrodes have annular or arcuate shapes. One upper stationary electrode 17ux is opposed to the movable electrode 25m to form a capacitor UX. The other upper stationary electrode 17uy is also opposed to the movable electrode 25m to form another capacitor UY. These two capacitors UX and UY constitute an upper set. One lower stationary electrode 30*lx* is opposed to the movable electrode 25*m* to form a capacitor LX. The other lower stationary electrode 30*ly* is also opposed to the movable electrode 25*m* to form another capacitor LY. These capacitors LX and LY constitute a lower set. Further, the capacitors UX and LX are vertically connected through the common movable electrode 25*m* to constitute one pair. In similar manner, the capacitors UY and LY also constitute another vertical pair. When such construction of the acceleration sensor receives an acceleration force in the linear direction as indicated by the arrow, the movable electrode 25*m* undergoes a vertical or elevational displacement effective to generate capacitance difference in each of the capacitor pairs. This capacitance difference is detected to measure a linear acceleration component along the given linear axis L. On the other hand, when the acceleration sensor receives an angular acceleration force around the rotation axis R as indicated by the arrow, the movable electrode 25*m* is angularly displaced. Consequently, a capacitance difference is generated in the same set of the capacitors. This difference is detected to measure an angular acceleration component. For example, when the movable electrode 25*m* is angularly displaced clockwise around the rotation axis R, the movable electrode 25*m* approaches to one upper stationary electrode 17*ux* to increase the capacitance of the capacitor UX. On the other hand, the movable electrode 25*m* leaves away from the other coplanar upper stationary electrode 17*uy* to decrease the capacitance of the capacitor UY. In this manner, capacitance balance is broken between the capacitors of the same set to enable detection of the angular acceleration force. Such capacitance unbalance is generated likewise in the lower set of the capacitors LX and LY in complementary manner to the upper set of the capacitors UX and UY.

FIG. 22 is a schematic circuit diagram showing connection of the four capacitors UX, UY, LX and LY. The four capacitors are connected in parallel to a common electrode in the form of the movable electrode 25*m* which is connected to the terminal 54*m*. The individual stationary electrodes 17*ux*, 17*uy*, 30*lx* and 30*ly* are connected, respectively, to the corresponding terminals 54*ux*, 54*uy*, 54*lx* and 54*ly*. The upper stationary electrode 17*ux* is connected to the corresponding terminal 54*ux* through a sequential path of the through-hole 19*ux*, rectangular lead pattern 22*ux*, guide opening 20*ux*, lead pin 10*ux* and through-hole pattern 51*ux*. The other upper stationary electrode 17*uy* is connected to the corresponding terminal 54*uy* through a sequential path of the through-hole 19*uy*, rectangular lead pattern 22*uy*, guide opening 20*uy*, lead pin 10*uy* and through-hole pattern 51*uy*. The lower stationary electrode 30*lx* is connected to the terminal 54*lx* through a sequential path of the through-hole 31*lx*, lead pattern 36*lx*, lead pattern 39*lx*, through-hole 40*lx*, lead pattern 46*lx* and lead pattern 48*lx*. The other lower stationary electrode 30*ly* is connected to the terminal 54*ly* through a sequential path of the through-hole 31*ly*, lead pattern 36*ly*, lead pattern 39*ly*, through-hole 40*ly*, lead pattern 46*ly*, and lead pattern 48*ly*. The movable electrode 25*m* is connected to the corresponding terminal 54*m* sequentially through a path of the central segment 26 of the diaphragm 3, spacer 9, junction pad pattern 32*m*, through-hole 33*m*, lead pattern 37*m*, lead pattern 41*m*, through-hole 42*m*, lead pattern 47*m* and lead pattern 49*m*.

FIG. 23 is a block diagram showing a detecting circuit externally connected to the acceleration sensor device. The left block enclosed by the dot-and-chain line represents the acceleration sensor device, and the right block enclosed by the dot-and-chain line represents the detecting circuit 101. The two blocks are connected to each other through the terminal 6 shown in FIG. 14. The detecting circuit 101 is comprised of one oscillating circuit 102, four buffers 103-106, and two comparators 107 and 108. As shown in the figure, the oscillating circuit 102 applies a pulse signal to the input terminal 54*m* of the sensor device. Consequently, the output terminals 54*lx*, 54*ly*, 54*ux* and 54*uy* produce pulse signals having pulse heights proportional to capacitances of the corresponding capacitors. Namely, the output terminal 54*ux* connected to one upper capacitor UX produces an output signal which is fed to a positive input terminal of the comparator 107 through the buffer 105. The output terminal 54*uy* connected to the other upper capacitor UY produces an output signal which is also fed to the same positive input terminal of the comparator 107 through the buffer 106. The output terminal 54*lx* connected to one lower capacitor LX produces an output signal which is fed to a negative input terminal of the comparator 107 through the buffer 103. In similar manner, the output terminal 54*ly* connected to the other lower capacitor LY produces an output signal which is fed to the negative input terminal of the comparator 107 through the buffer 104. The comparator 107 outputs an electric signal indicative of a linear acceleration component a according to the amplitude difference of the signals received at the pair of positive and negative input terminals.

The other comparator 108 receives, at its positive input terminal, signals fed from the output terminals 54*lx* and 54*uy* of the sensor device, and receives, at its negative input terminal, signals fed from the remaining output terminals 54*ly* and 54*ux*. Accordingly, the comparator 108 outputs an electric signal indicative of an angular acceleration component θ.

The stationary electrodes are divided in two parts by a single rotation axis in the above described embodiment. However, the present invention is not limited to such embodiment. For example, the coplanar stationary electrodes may be divided into four parts by a pair of orthogonal rotation axes to detect different angular acceleration components around the respective rotation axes.

As described above, according to the fourth embodiment of the invention, a linear acceleration component and an angular acceleration component can be detected concurrently.

What is claimed is:

1. An acceleration sensor comprising:
   a first stationary substrate having a first central junction pad and a first peripheral stationary electrode of an annular shape surrounding the first central junction pad;
   a second stationary substrate having a second central junction pad and a second peripheral stationary electrode of an annular shape which surrounds the second central junction pad and which is opposed to the first peripheral stationary electrode with a given spacing;
   an electrically conductive diaphragm having a central segment fixed in the spacing between the pair of first and second junction pads and a peripheral segment of an annular shape surrounding around and extending resiliently from the central segment to undergo a displacement in the spacing relative to the first and second peripheral stationary electrodes in response to an external acceleration force;

a pair of spacers composed of thin metal plates having an identical shape and an identical thickness with each other, and being disposed between respective ones of the first and second central junction pads and the central segment of the diaphragm to sandwich the same such as to provide an electrical path from the peripheral segment to either of the first and second central junction pads, and a coupling member passing through the central segment for securing a superposed structure of the diaphragm, the pair of spacers, and the pair of first and second stationary substrates with each other.

2. An acceleration sensor according to claim 1; wherein at least one of the stationary electrodes is composed of an electroconductive pattern which has an adjustable area dimension.

3. An acceleration sensor according to claim 2; wherein the electro-conductive pattern is comprised of a main section having a fixed area dimension and a variable section which can be cut selectively from the main section.

4. An acceleration sensor according to claim 3; wherein the electro-conductive pattern has a total area dimension greater than an area dimension of the opposing stationary electrode.

5. An acceleration sensor according to claim 4; including a laminated structure comprised sequentially of a circuit board formed with a lead pattern for external connection, one stationary substrate, a diaphragm and another stationary substrate, and wherein one stationary electrode formed on said one stationary substrate and the junction pad are electrically connected to the lead pattern by face-to-face contact of through-holed patterns formed on respective layers of the laminated structure.

6. An acceleration sensor according to claim 5; including a junction plate formed on its top and bottom surfaces with a through-holed pattern, and being interposed between the circuit board and said one stationary substrate to electrically connect said board and said substrate.

7. An acceleration sensor according to claim 5; including an electrically conductive member which passes through the laminated structure for electrically connecting another stationary electrode formed on said another stationary substrate to the lead pattern of the circuit board.

8. An acceleration sensor according to claim 5; wherein said lead pattern includes a land portion around each through-holed pattern, and an arcuate portion, and said land portion is disposed in spaced relation to said arcuate portion.

9. An acceleration sensor according to claim 1; including parallel pins which pass in a thickness direction of the opposed stationary substrates so as to secure parallel relation of the stationary substrates.

10. An acceleration sensor according to claim 1; including one set of stationary electrodes formed on a concealed face of one stationary substrate and divided from each other along a rotation axis orthogonal to a given linear axis which is normal to the stationary substrates; another set of stationary electrodes formed on a concealed face of the other stationary substrate and opposed in registration with said one set of stationary electrodes to constitute each pair of the opposed stationary electrodes; and wherein the peripheral segment of the diaphragm is interposed between the one set of stationary electrodes and the other set of stationary electrodes, the peripheral segment being responsive to a linear acceleration component along the linear axis and to an angular acceleration component around the rotation axis to undergo a displacement.

11. An acceleration sensor according to claim 10; wherein the peripheral segment has an annular shape, and each set of the stationary electrodes has a circular shape divided radially from each other.

12. An acceleration sensor according to claim 10; including a detection circuit operative to detect an angular acceleration component according to a capacitance difference caused in variable capacitors formed between each set of the stationary electrodes and the peripheral segment, and being operative to detect a linear acceleration component according to another capacitive difference caused in variable capacitors formed between the peripheral segment and each pair of the stationary electrodes.

* * * * *